United States Patent
Imanishi et al.

(10) Patent No.: US 12,060,064 B2
(45) Date of Patent: Aug. 13, 2024

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Yuki Imanishi, Wako (JP); Daichi Kato, Wako (JP); Katsuya Yashiro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 297 days.

(21) Appl. No.: 17/674,933

(22) Filed: Feb. 18, 2022

(65) Prior Publication Data
US 2022/0297692 A1 Sep. 22, 2022

(30) Foreign Application Priority Data
Mar. 16, 2021 (JP) .................. 2021-042029

(51) Int. Cl.
*B60W 30/182* (2020.01)
*B60W 10/20* (2006.01)
(Continued)

(52) U.S. Cl.
CPC .......... *B60W 30/182* (2013.01); *B60W 10/20* (2013.01); *B60W 30/143* (2013.01);
(Continued)

(58) Field of Classification Search
CPC .. B60W 30/182; B60W 10/20; B60W 30/143; B60W 30/18163; B60W 40/105;
(Continued)

(56) References Cited

U.S. PATENT DOCUMENTS

2019/0354108 A1  11/2019  Okajima et al.
2021/0061312 A1   3/2021  Wang

FOREIGN PATENT DOCUMENTS

JP  2016-504232  2/2016
JP  2017-174282  9/2017
(Continued)

OTHER PUBLICATIONS

Japanese Office Action for Japanese Patent Application No. 2021-042029 dated Nov. 8, 2022.

*Primary Examiner* — Michael D Lang
(74) *Attorney, Agent, or Firm* — Amin, Turocy & Watson, LLP

(57) ABSTRACT

A vehicle control device of an embodiment includes a recognizer that recognizes a surroundings situation of a vehicle, a driving controller that controls one or both of steering and acceleration or deceleration of the vehicle, and a first receiver that receives an operation of switching between driving modes, the driving controller causes the vehicle to travel in any of a plurality of driving modes including a first mode and a second mode in which a task imposed on an occupant of the vehicle is lighter than that in the first mode, and the driving controller switches the driving mode from the first mode to the second mode after a speed of the vehicle reaches a target speed when a traveling environment is such that the first mode is being executed and the second mode is able to be executed and when an operation of switching to the second mode.

15 Claims, 13 Drawing Sheets

(51) Int. Cl.
  *B60W 30/14* (2006.01)
  *B60W 30/18* (2012.01)
  *B60W 40/105* (2012.01)
  *B60W 50/00* (2006.01)
  *B60W 50/14* (2020.01)

(52) U.S. Cl.
  CPC .... *B60W 30/18163* (2013.01); *B60W 40/105* (2013.01); *B60W 50/14* (2013.01); *B60W 2050/0083* (2013.01); *B60W 2050/143* (2013.01); *B60W 2050/146* (2013.01)

(58) Field of Classification Search
  CPC ......... B60W 50/14; B60W 2050/0083; B60W 2050/143; B60W 2050/146
  See application file for complete search history.

(56) References Cited

FOREIGN PATENT DOCUMENTS

| | | |
|---|---|---|
| WO | 2014/085380 | 6/2014 |
| WO | 2018/122966 | 7/2018 |
| WO | 2018/138765 | 8/2018 |

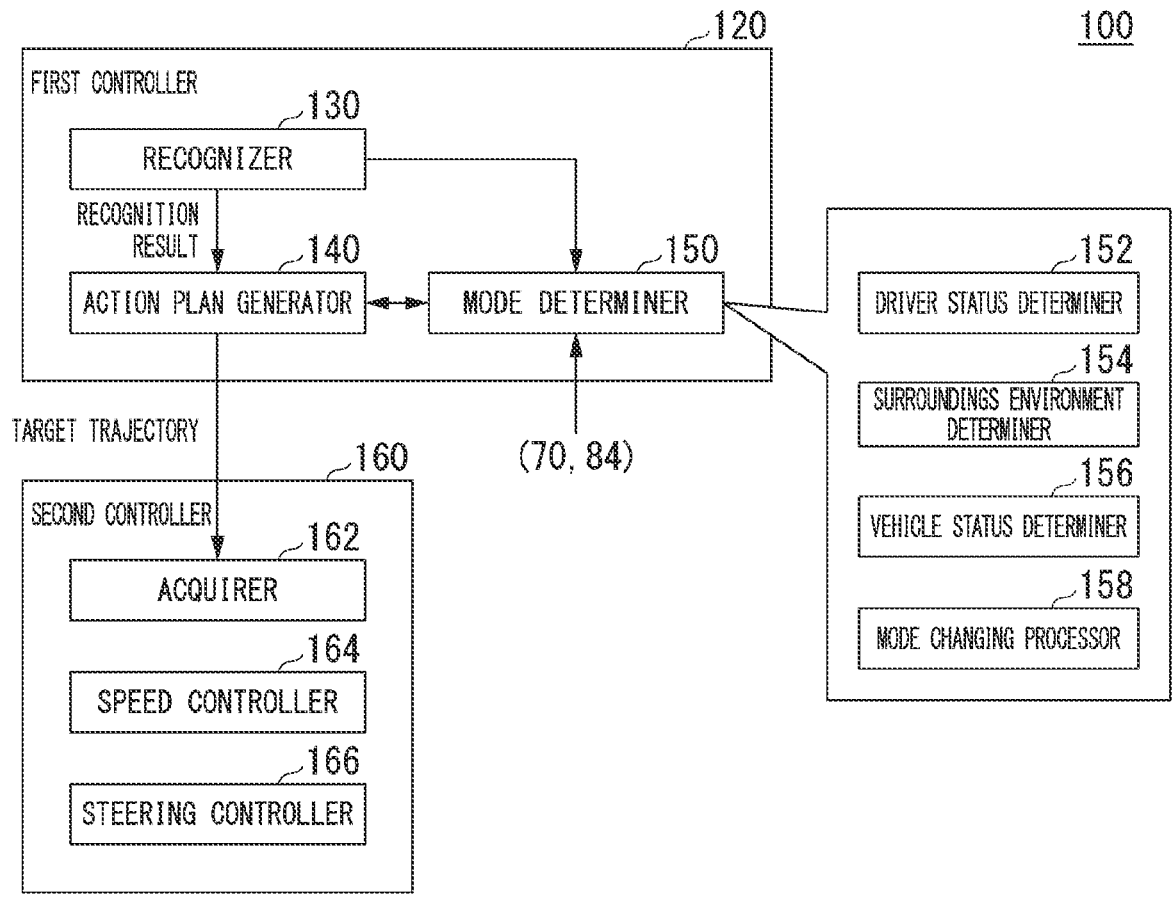

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2021-042029, filed Mar. 16, 2021, the content of which is incorporated herein by reference.

BACKGROUND

Field of the Invention

The present invention relates to a vehicle control device, a vehicle control method, and a storage medium.

Description of Related Art

In recent years, research on automated driving in which traveling of a vehicle is automatically controlled is underway. In connection thereto, a technology for executing automated driving under a specific condition such as congestion follow-up is known (for example, International Publication No. 2018/138765).

SUMMARY

However, appropriate execution of driving control in which a task imposed on an occupant is light under various situations such as a situation in which there are no other vehicles in the surroundings is not taken into account.

An aspect of the present invention has been made in consideration of such circumstances, and is to provide a vehicle control device, a vehicle control method, and a storage medium capable of more appropriately executing driving control in which a task imposed on an occupant is light under various situations.

The vehicle control device, vehicle control method, and storage medium according to the present invention have the following configurations.

(1): A vehicle control device according to an aspect of the present invention is a vehicle control device including: a recognizer configured to recognize a surroundings situation of a vehicle; a driving controller configured to control one or both of steering and acceleration or deceleration of the vehicle based on the surroundings situation recognized by the recognizer; and a first receiver configured to receive an operation of switching between driving modes of the vehicle by an occupant of the vehicle, wherein the driving controller causes the vehicle to travel in any of a plurality of driving modes including a first driving mode and a second driving mode in which a task imposed on the occupant of the vehicle is lighter than that in the first driving mode, and the driving controller switches the driving mode from the first driving mode to the second driving mode after a speed of the vehicle reaches a target speed when a traveling environment is such that the first driving mode is being executed and the second driving mode is able to be executed and when an operation of switching to the second driving mode is received by the first receiver.

(2): In the aspect (1), the traveling environment in which the second driving mode is able to be executed includes that the vehicle travels in a traveling lane and then a predetermined distance or more or a predetermined time or more is reached.

(3): In the aspect (1), the vehicle control device further includes an output controller configured to cause an output to output information on a status of the driving mode to the occupant of the vehicle, and the output controller causes the output to output information indicating that the second driving mode is able to be executed when the traveling environment is such that the first driving mode is being executed and the second driving mode is able to be executed.

(4): In the aspect (1), acceleration or deceleration to the target speed is performed according to speed control by an operation of the occupant or speed control by the driving controller.

(5): In the aspect (1), the vehicle control device further includes a second receiver configured to receive a setting of a speed when the vehicle travels in the first driving mode, and the driving controller adjusts the speed of the vehicle based on the set speed received by the second receiver.

(6): In the aspect (3), the output controller causes the output to output information for requesting the occupant to control the speed of the vehicle when adjustment of the speed of the vehicle to the target speed is required.

(7): In the aspect (5), the driving controller switches the driving mode from the first driving mode to the second driving mode when the speed of the vehicle reaches the target speed through the adjustment of the set speed.

(8): In the aspect (1), the target speed is a speed within a legal speed for a traveling lane of the vehicle.

(9): In the aspect (8), the driving controller curbs the execution of the second driving mode when a lower limit speed is set for the traveling lane and the speed of the vehicle is smaller than the lower limit speed for the traveling lane.

(10): In the aspect (9), the driving controller continues the second driving mode when the speed of the vehicle becomes smaller than the lower limit speed after the second driving mode is executed.

(11): In the aspect (1), a lane in which the vehicle travels includes an overtaking lane for overtaking a preceding vehicle, and the driving controller performs lane changing of the vehicle from the overtaking lane to a lane other than the overtaking lane when the traveling environment is such that the vehicle is executing the first driving mode and the second driving mode is able to be executed and when an operation of switching to the second driving mode is received by the first receiver, and switches the driving mode from the first driving mode to the second driving mode after the speed of the vehicle reaches the target speed or after the speed of the vehicle reaches the target speed and then lane changing from the overtaking lane to the lane other than the overtaking lane is performed.

(12): A vehicle control method according to an aspect of the present invention is a vehicle control method including: recognizing, by a computer, a surroundings situation of a vehicle; controlling, by the computer, one or both of steering and acceleration or deceleration of the vehicle based on the recognized surroundings situation; receiving, by the computer, an operation of switching between driving modes of the vehicle by an occupant of the vehicle; causing, by the computer, the vehicle to travel in any of a plurality of driving modes including a first driving mode and a second driving mode in which a task imposed on an occupant of the vehicle is lighter than that in the first driving mode; and switching, by the computer, the driving mode from the first driving mode to the second driving mode after a speed of the vehicle reaches a target speed when a traveling environment is such that the first driving mode is being executed and the second driving mode is able to be executed and when an operation of switching to the second driving mode is received.

(13): A storage medium according to an aspect of the present invention is a computer-readable non-transitory storage medium having a program stored therein, the program causing a computer to: recognize a surroundings situation of a vehicle; control one or both of steering and acceleration or deceleration of the vehicle based on the recognized surroundings situation; receive an operation of switching between driving modes of the vehicle by an occupant of the vehicle; cause the vehicle to travel in any of a plurality of driving modes including a first driving mode and a second driving mode in which a task imposed on an occupant of the vehicle is lighter than that in the first driving mode; and switch the driving mode from the first driving mode to the second driving mode after a speed of the vehicle reaches a target speed when a traveling environment is such that the first driving mode is being executed and the second driving mode is able to be executed and when an operation of switching to the second driving mode is received.

According to the aspects (1) to (13), it is possible to more appropriately execute driving control in which a task imposed on an occupant is light under various situations.

BRIEF DESCRIPTION OF THE DRAWING

FIG. 2 is a functional configuration diagram of a first controller and a second controller.

FIG. 3 is a diagram illustrating an example of a relationship between a driving mode, a control status of the vehicle, and a task.

DESCRIPTION OF EMBODIMENT

Hereinafter, embodiments of a vehicle control device, a vehicle control method, and a storage medium of the present invention will be described with reference to the drawings.

First Embodiment

[Overall Configuration]

Figure 1:
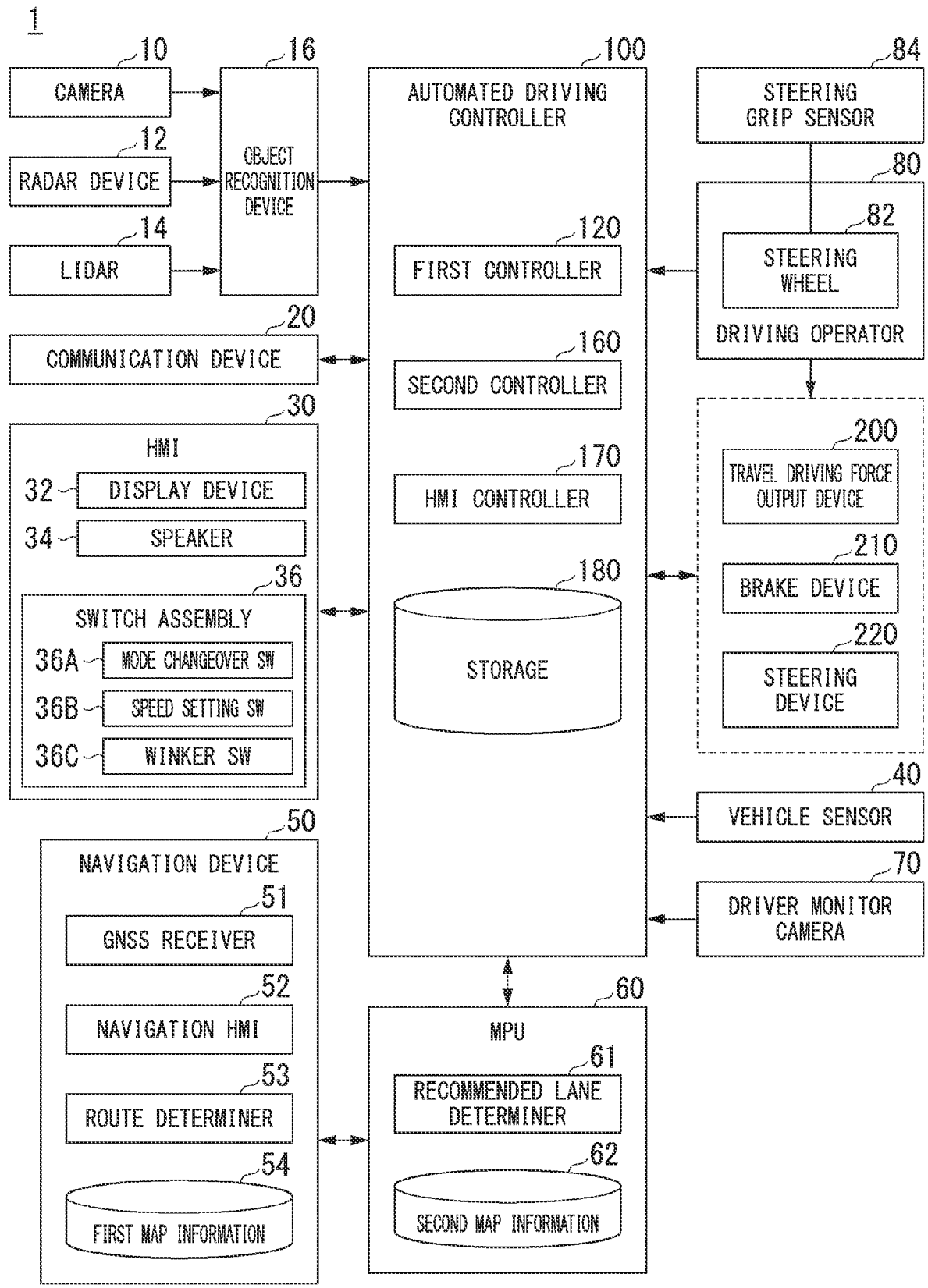
FIG. 1 is a configuration diagram of a vehicle system using a vehicle control device according to a first embodiment.

FIG. 1 is a configuration diagram of a vehicle system 1 using a vehicle control device according to a first embodiment. A vehicle on which the vehicle system 1 is mounted is, for example, a vehicle such as a two-wheeled vehicle, a three-wheeled vehicle, or a four-wheeled vehicle, and a driving source thereof includes an internal combustion engine such as a diesel engine or a gasoline engine, an electric motor, or a combination thereof. The electric motor operates using power generated by a power generator connected to the internal combustion engine or discharge power of a secondary battery or a fuel cell. Hereinafter, an embodiment in which the vehicle control device is applied to an automated driving vehicle will be described by way of example. The automated driving is, for example, to automatically control one or both of steering and acceleration or deceleration of a vehicle to execute driving control. Examples of the driving control of the vehicle may include various driving assistance such as adaptive cruise control (ACC), auto lane changing (ALC), lane keeping assistance system (LKAS), and traffic jam pilot (TJP). The automated driving vehicle may be a vehicle whose driving is controlled by manual driving of an occupant (driver).

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driver monitor camera 70, a driving operator 80, an automated driving controller 100, a travel driving force output device 200, a brake device 210, and a steering device 220. These devices or equipment are connected to each other by a multiplex communication line such as a controller area network (CAN) communication line, a serial communication line, a wireless communication network, or the like. The configuration illustrated in FIG. 1 is merely an example, and a part of the configuration may be omitted or other configurations may be added thereto. The HMI 30 is an example of an "output". The automated driving controller 100 is an example of a "vehicle control device".

The camera 10 is, for example, a digital camera using a solid-state imaging device such as a charge coupled device (CCD) or a complementary metal oxide semiconductor (CMOS). The camera 10 is attached to any location on a vehicle (hereinafter, a host vehicle M) in which the vehicle system 1 is mounted. In the case of forward imaging, the camera 10 is attached to, for example, an upper portion of a front windshield, a rear surface of a rearview mirror, or the like. The camera 10, for example, periodically and repeatedly images surroundings of the host vehicle M. The camera 10 may be a stereo camera.

The radar device 12 radiates radio waves such as millimeter waves to the surroundings of the host vehicle M and detects radio waves (reflected waves) reflected by an object to detect at least a position (a distance and orientation) of the object. The radar device 12 is attached to any location on the host vehicle M. The radar device 12 may detect a position and a speed of the object using a frequency modulated continuous wave (FM-CW) scheme.

The LIDAR 14 irradiates the surroundings of the host vehicle M with light (or an electromagnetic wave having a wavelength close to that of light) and measures scattered light. The LIDAR 14 detects a distance to a target based on a time from light emission to light reception. The light to be radiated is, for example, pulsed laser light. The LIDAR 14 is attached to any location on the host vehicle M.

The object recognition device 16 performs sensor fusion processing on detection results of some or all of the camera 10, the radar device 12, and the LIDAR 14 to recognize a position, type, speed, and the like of the object. The object recognition device 16 outputs recognition results to the automated driving controller 100. The object recognition device 16 may output detection results of the camera 10, the radar device 12, and the LIDAR 14 as they are to the automated driving controller 100. The object recognition device 16 may be omitted from the vehicle system 1.

The communication device 20, for example, communicates with another vehicle present around the host vehicle M using a cellular network, a Wi-Fi network, Bluetooth (registered trademark), dedicated short range communication (DSRC), or the like or communicates with various server devices via a wireless base station.

The HMI 30 presents various types of information to the occupant of the host vehicle M and receives an input operation from the occupant under the control of the HMI controller 170. The HMI 30 includes, for example, a display device 32, a speaker 34, and a switch assembly 36. The HMI 30 may include a microphone, a buzzer, a key, and the like.

The display device 32 is, for example, a liquid crystal display (LCD) or an organic electro luminescence (EL) display device. The display device 32 is provided, for example, near the front of a driver's seat (a seat closest to a steering wheel SW) in an instrument panel, and is installed in a position visible to the occupant through a gap in the steering wheel or through the steering wheel. Information necessary for traveling at the time of manual driving or automated driving of the host vehicle M (hereinafter referred to as driving assistance information) is displayed as an image on the display device 32. The speed of the host vehicle M, revolutions per minute of an engine, a remaining amount of fuel, a radiator water temperature, a traveling distance, a status of a shift lever, a lane (demarcation line) or other vehicles recognized by the object recognition device 16, the automated driving controller 100, or the like, a lane in which the host vehicle M is to travel, and a future target trajectory, for example, are included in the driving assistance information. Information for inquiring the occupant about whether or not to switch the driving mode of the host vehicle M, information indicating, for example, a status of driving control, and the like may be included in the driving assistance information.

The display device 32 may be installed near a center of an instrument panel IP, in addition to the above-described position. In this case, for example, an image showing a navigation result of the navigation device 50, in addition to the driving assistance information, is displayed on the display device 32. A television program may be displayed on the display device 32 or content stored on a DVD or content such as a movie downloaded from an external device via the communication device 20 may be displayed on the display device 32.

The display device 32 may include, for example, a head up display (HUD). The HUD projects a video onto a predetermined imager. The HUD, for example, projects an image onto a part of a front windshield in front of the driver's seat so that a virtual image is visually recognized with eyes of an occupant seated in the driver's seat. For example, driving assistance information is displayed on the HUD. Control of a display on the display device 32 is controlled by the HMI controller 170, which will be described below. The display device 32 may be configured as a touch panel having a function of a receiver that receives an operation input from the occupant.

At least one speaker 34 is installed in a vehicle cabin. The speaker 34 outputs a voice, a warning sound, or the like under the control of the HMI controller 170, for example.

The switch assembly 36 includes, for example, a mode changeover switch (hereinafter, the switch is referred to as "SW") 36A, a speed setting SW 36B, and a winker SW (direction indicator) 36C. The mode changeover SW 36A is an example of a "first receiver". The speed setting SW 36B is an example of a "second receiver".

The mode changeover SW 36A and the speed setting SW 36B are attached to, for example, the steering wheel. The winker SW 36C is provided in, for example, a steering column or a steering wheel. At least some of the mode changeover SW 36A, the speed setting SW 36B, and the winker SW 36C may be provided as a graphical user interface (GUI) switch included in an image displayed on the display device 32 functioning as a touch panel.

The mode changeover SW 36A is a switch that receives an operation of switching between driving modes of the host vehicle M by the occupant. When the mode changeover SW 36A is operated, for example, the driving modes of the host vehicle M are switched therebetween by an ON and OFF operation. The mode changeover SW 36A may be a switch that selects one of a plurality of driving modes. The mode changeover SW 36A may be a switch that receives approval of the occupant in response to an inquiry about whether or not the mode is switched. The mode changeover SW 36A may be a switch that stops the mode switching.

The speed setting SW 36B is a switch that receives a setting of a target speed of the host vehicle M at the time of execution of a predetermined driving mode from the occupant. Hereinafter, the speed set by the speed setting SW 36B is referred to as a "set speed". The winker SW 36C is, for example, an example of an operator that receives an instruction to change a lane of the host vehicle M by the occupant. For example, when the winker SW 36C is operated in a direction in which the host vehicle M performs lane changing, a light (winker) outside the vehicle associated with the direction in which the host vehicle M performs lane changing blinks.

The vehicle sensor 40 includes, for example, a vehicle speed sensor that detects a speed of the host vehicle M, an acceleration sensor that detects an acceleration, a yaw rate sensor that detects an angular speed around a vertical axis, and an orientation sensor that detects a direction of the host vehicle M. The vehicle sensor 40 may include a position sensor that acquires the position of the host vehicle M. The position sensor is, for example, a sensor that acquires position information (longitude and latitude information) from a global positioning system (GPS) device. The position sensor may be a sensor that acquires the position information using a global navigation satellite system (GNSS) receiver 51 of the navigation device 50.

The navigation device 50 includes, for example, the GNSS receiver 51, a navigation HMI 52, and a route determiner 53. The navigation device 50 holds first map information 54 in a storage device such as a hard disk drive (HDD) or a flash memory. The GNSS receiver 51 specifies a position of the host vehicle M based on a signal received from GNSS satellites. The position of the host vehicle M may be specified or complemented by an inertial navigation system (INS) using an output of the vehicle sensor 40. The navigation HMI 52 includes a display device, a speaker, a touch panel, keys, and the like. The navigation HMI 52 may be partly or wholly shared with the HMI 30 described above. The route determiner 53, for example, determines a route (hereinafter, an on-map route) from the position of the host vehicle M specified by the GNSS receiver 51 (or any input position) to a destination input by the occupant using the navigation HMI 52 by referring to the first map information 54. The first map information 54 is, for example, information in which a road shape is represented by links indicating roads and nodes connected by the links. The first map information 54 may include a curvature of the road, point of interest (POI) information, and the like. The on-map route is output to the MPU 60. The navigation device 50 may perform route guidance using the navigation HMI 52 based on the on-map route. The navigation device 50 may be realized, for example, by a function of a terminal device such as a smartphone or a tablet terminal possessed by the occupant. The navigation device 50 may transmit a current position and a destination to a navigation server via the communication device 20 and acquire the same route as the on-map route from the navigation server.

The MPU 60 includes, for example, a recommended lane determiner 61, and holds second map information 62 in a storage device such as an HDD or a flash memory. The recommended lane determiner 61 divides the on-map route provided from the navigation device 50 into a plurality of blocks (for example, divides the route every 100 [m] in a traveling direction of the vehicle), and determines a recommended lane for each block by referring to the second map information 62. The recommended lane determiner 61 determines in which lane from the left the host vehicle M travels. The recommended lane determiner 61 determines the recommended lane so that the host vehicle M can travel on a reasonable route for travel to a branch destination when there is a branch location in the on-map route.

The second map information 62 is map information with higher accuracy than the first map information 54. The second map information 62 includes, for example, information on a center of the lane or information on a boundary of the lane. Road information (a type of road), legal speed (speed limit, maximum speed, and minimum speed), traffic regulation information, address information (an address and postal code), facility information, telephone number information, and the like may be included in the second map information 62. The second map information 62 may be updated at any time by the communication device 20 communicating with another device.

The driver monitor camera 70 is, for example, a digital camera that uses a solid-state image sensor such as a CCD or CMOS. The driver monitor camera 70, for example, is attached to any location on the host vehicle M in a position and orientation in which a head of an occupant (hereinafter referred to as a driver) seated in the driver's seat of the host vehicle M can be imaged from the front (in a direction in which a face is imaged). For example, the driver monitor camera 70 is attached to an upper portion of the display device provided in a central portion of the instrument panel of the host vehicle M.

The driving operator 80 includes, for example, an accelerator pedal, a brake pedal, a shift lever, and other operators, in addition to a steering wheel 82. A sensor that detects an amount of operation or the presence or absence of the operation is attached to the driving operator 80, and a result of the detection is output to the automated driving controller 100 or some or all of the travel driving force output device 200, the brake device 210, and the steering device 220. The steering wheel 82 is an example of an "operator that receives a steering operation by the driver". The operator does not necessarily have to be annular and may be in the form of a variant steering wheel, joystick, or button, for example. A steering grip sensor 84 is attached to the steering wheel 82.

The steering grip sensor 84 is realized by a capacitance sensor or the like, and outputs a signal allowing detection as to whether or not the driver is gripping the steering wheel 82 (meaning that the driver is in contact with the steering wheel 82 in a state in which a force is applied) to the automated driving controller 100.

The automated driving controller 100 includes, for example, a first controller 120, a second controller 160, an HMI controller 170, and a storage 180. The first controller 120, the second controller 160, and the HMI controller 170 are realized, for example, by a hardware processor such as a central processing unit (CPU) executing a program (software). Further, some or all of these components may be realized by hardware (circuit; including circuitry) such as a large scale integration (LSI), an application specific integrated circuit (ASIC), a field-programmable gate array (FPGA), or a graphics processing unit (GPU), or may be realized by software and hardware in cooperation. The program may be stored in a storage device (a storage device including a non-transitory storage medium) such as an HDD or a flash memory of the automated driving controller 100 in advance or may be stored in a detachable storage medium such as a DVD or a CD-ROM and installed in the HDD or flash memory of the automated driving controller 100 by the storage medium (a non-transitory storage medium) being mounted in a drive device. A combination of the action plan generator 140 and the second controller 160 is an example of a "driving controller". The HMI controller 170 is an example of an "output controller".

The storage 180 may be realized by various storage devices described above, a solid state drive (SSD), an electrically erasable programmable read only memory (EEPROM), a read only memory (ROM), a random access memory (RAM), or the like. Information necessary for execution of the driving control in the present embodiment, various types of other information, and programs, for example, are stored in the storage 180.

FIG. 2 is a functional configuration diagram of the first controller 120 and the second controller 160. The first controller 120 includes, for example, a recognizer 130, an action plan generator 140 and a mode determiner 150. The first controller 120 realizes, for example, a function using artificial intelligence (AI) and a function using a previously given model in parallel. For example, a function of "recognizing an intersection" may be realized by recognition of the intersection using deep learning or the like and recognition based on previously given conditions (there is a signal which can be subjected to pattern matching, a road sign, or the like) being executed in parallel and scored for comprehensive evaluation. Accordingly, the reliability of automated driving is ensured.

The recognizer 130 recognizes a status such as a position (relative position), speed (relative speed), and acceleration of an object (for example, another vehicle or another obstacle) present around the host vehicle M based on information input from the camera 10, the radar device 12, and the LIDAR 14 via the object recognition device 16. The position of the object, for example, is recognized as a position at absolute coordinates with a representative point (a centroid, a drive shaft center, or the like) of the host vehicle M as an origin, and is used for control. The position of the object may be represented by a representative point such as a centroid or a corner of the object or may be represented by an area. The "status" of the object may include an acceleration or jerk of another vehicle, or an "action status" (for example, whether or not the vehicle is changing lanes or is about to change lanes) when the object is a mobile object such as the other vehicle.

The recognizer 130, for example, recognizes a lane (a traveling lane) in which the host vehicle M is traveling. For example, the recognizer 130 compares a pattern of road demarcation lines (for example, an arrangement of solid lines and broken lines) obtained from the second map information 62 with a pattern of road demarcation lines around the host vehicle M recognized from an image captured by the camera 10 to recognize the traveling lane. The recognizer 130 may recognize not only the road demarcation lines but also a traveling road boundary (a road boundary) including road demarcation lines, a road shoulder, a curb, a median strip, a guard rail, or the like to recognize the traveling lane. In this recognition, the position of the host vehicle M acquired from the navigation device 50 or a processing result of an INS may be additionally considered. The recognizer 130 recognizes a temporary stop line, an obstacle, a red signal, a toll gate, a road sign, and other road events. The recognizer 130 recognizes an adjacent lane adjacent to the traveling lane. The adjacent lane is, for example, a lane in which a vehicle can travel in the same direction as the traveling lane.

The recognizer 130 recognizes a position or posture of the host vehicle M with respect to the traveling lane when recognizing the traveling lane. The recognizer 130 may recognize, for example, a deviation of a reference point of the host vehicle M from a center of the lane and an angle formed between a traveling direction of the host vehicle M and a line connecting along the center of the lane as a relative position and posture of the host vehicle M with respect to the traveling lane. Instead, the recognizer 130 may recognize, for example, a position of the reference point of the host vehicle M with respect to any one of side end portions (the road demarcation line or the road boundary) of the traveling lane as the relative position of the host vehicle M with respect to the traveling lane. Here, the reference point of the host vehicle M may be a center of the host vehicle M or may be a centroid. The reference point may be an end portion (a front end portion or a rear end portion) of the host vehicle M, or may be a position in which one of a plurality of wheels included in the host vehicle M exists.

In principle, the action plan generator 140 generates a target trajectory along which the host vehicle M will travel in the future automatically (without depending on an operation of a driver) so that the host vehicle M can travel in the recommended lane determined by the recommended lane determiner 61 and respond to a surroundings situation of the host vehicle M. The target trajectory includes, for example, a speed element. For example, the target trajectory is represented as a sequence of points (trajectory points) to be reached by the host vehicle M. The trajectory point is a point that the host vehicle M is to reach for each predetermined traveling distance (for example, several meters) along a road, and a target speed and a target acceleration at every predetermined sampling time (for example, every several tenths of a [sec]) are separately generated as a part of the target trajectory. The trajectory point may be a position that the host vehicle M is to reach at the sampling time at every predetermined sampling time. In this case, information on the target speed or the target acceleration is represented by an interval between the trajectory points. When the set speed of the host vehicle M is determined in advance, the action plan generator 140 may generate a target trajectory such that the speed of the host vehicle M reaches the set speed within a range in which the host vehicle M can travel.

When the action plan generator 140 generates the target trajectory, the action plan generator 140 may set an event (function) of automated driving. Examples of the automated driving event include a constant speed traveling event, a low speed following traveling event, a lane changing event, a branching event, a merging event, and a takeover event. The action plan generator 140 generates a target trajectory according to an activated event.

The mode determiner 150 determines a driving mode that is executed by the host vehicle M to be any one of a plurality of driving modes in which tasks imposed on an occupant differ (in other words, a plurality of modes having different degrees of automation), based on, for example, a situation of the host vehicle M. The driving controller causes the host vehicle M to travel in the mode determined by the mode determiner 150. The mode determiner 150 includes, for example, a driver status determiner 152, a surroundings environment determiner 154, a vehicle status determiner 156, and a mode changing processor 158. These individual functions will be described below. In the following description, it is assumed that the occupant is the driver.

FIG. 3 is a diagram illustrating an example of a relationship between the driving mode, a control status of the host vehicle M, and the tasks. The driving mode of the host vehicle M includes, for example, five modes from mode A to mode E. In modes A to E, the control status, that is, a degree of automation of the driving control of the host vehicle M is highest in mode A, decreases in order of mode B, mode C, and mode D, and is lowest in mode E. On the other hand, a task imposed on the occupant is lightest in mode A, is more severe in order of mode B, mode C, and mode D, and is most severe in mode E in which the manual driving is performed. In modes B to E, since a control status that is not automated driving is reached, the automated driving controller 100 is responsible for ending control related to automated driving and shifting to driving assistance or manual driving. Mode B is an example of a "first driving mode", and mode A is an example of a "second driving mode". Modes C to E may be included in the first driving mode.

In mode A, an automated driving status is reached and a task for any of monitoring the surroundings of the host vehicle M and gripping the steering wheel 82 (hereinafter referred to as "steering grip") is not imposed on the driver. Whether or not the driver performs the surroundings monitoring is determined based on, for example, a result of analyzing the captured image of the driver monitor camera 70, and whether or not the driver performs the steering grip is determined based on, for example, a detection result of the steering grip sensor 84. The surroundings monitoring includes at least monitoring the front side of the host vehicle M. The front side means a space in the traveling direction of the host vehicle M that is visually recognized through the front windshield. However, even in mode A, the driver is required to be in a posture in which shift to manual driving can be rapidly performed in response to a request from a system mainly including the automated driving controller 100. The term "automated driving" referred to herein means that both the steering and the speed of the host vehicle M are controlled without depending on an operation of the driver.

Mode A is a driving mode that can be executed when the host vehicle M is traveling at a predetermined speed (for example, about 50 [km/h]) or less on a road for exclusive use of vehicles such as an expressway and a condition such as the presence of a preceding vehicle as a follow-up target is satisfied, and may be referred to as a "TJP mode". Mode A is a driving mode that can be executed within a range in which the speed of the host vehicle M does not exceed a legal speed (speed limit) for a traveling lane when a situation of the host vehicle M satisfies a predetermined condition, in addition to the above-described TJP mode, and may be referred to as an "independent automated driving mode". When the independent automated driving mode is executed, for example, the speed of the host vehicle M is required not to exceed the legal speed (maximum speed) for the traveling lane, or a mode switching instruction (approval) according to a predetermined operation of the driver is required. When a traveling condition in mode A is not satisfied or when a mode switching instruction is received by the mode changeover SW 36A, the mode determiner 150 changes the driving mode of the host vehicle M to another mode (for example, mode B).

The driver can execute a second task while mode A is being executed. The second task is, for example, an action other than driving of the driver that is allowed during automated driving of the host vehicle M. Examples of the second task include watching television, making a mobile phone call, sending and receiving emails and eating.

In mode B, a driving assistance state is reached, and a task for monitoring surroundings of the host vehicle M (hereinafter referred to as surroundings monitoring) is imposed on the driver, but a task for gripping the steering wheel 82 is not imposed. In mode B, for example, ACC, ALC, LKAS, or the like is executed. ACC, ALC, and LKAS may also be executed, for example, in modes C and D under the restriction of a predetermined task. For example, in mode B, the lane changing (ALC) of the host vehicle M based on, for example, setting of a route to a destination by the navigation device 50 is performed according to a determination of the vehicle system 1 without reception of a lane changing instruction from the driver. The lane changing is to move the host vehicle M from a host lane in which the host vehicle M is traveling to an adjacent lane adjacent to the host lane.

In mode C, a driving assistance state is reached and a task for surroundings monitoring and a task for gripping the steering wheel 82 are imposed on the driver. For example, in mode C, when it is determined by the vehicle system 1 that lane changing of the host vehicle M is required, the driver is inquired via the HMI 30, and when approval for the lane changing by the occupant is received from the HMI 30 or the like, driving assistance for execution of lane changing is performed.

Mode D is a driving mode in which a certain degree of driving operation by the driver is required for at least one of steering and acceleration or deceleration of the host vehicle M. In mode D, when an instruction to change the lane of the host vehicle M according to an operation of the winker SW 36C by the driver is received, driving assistance for executing the lane changing in an instructed direction is performed. The lane changing in mode D may be executed in mode C. An operation of the winker SW 36C by the driver is an example of a driving operation. The lane changing in modes B to D may be an example of a lane changing event.

In mode E, a manual driving status requiring a driving operation by the driver is reached for both steering and acceleration or deceleration of the host vehicle M. In both mode D and mode E, a task for monitoring the front side of the host vehicle M is naturally imposed on the driver. A driving subject in modes C to E is the driver.

The mode determiner 150 determines the driving mode to be executed by the host vehicle M based on a status of the driver, the surroundings environment of the host vehicle M, and the status of the host vehicle M. The mode determiner 150 may determine whether or not the host vehicle M is in a state in which switching from a current driving mode to a driving mode in which a task imposed on the driver is light can be performed (a ready state), and may perform changing to an appropriate mode according to a situation in a situation in which the current driving mode cannot be executed. The mode determiner 150 may acquire an execution status of the task, and change the driving mode of the host vehicle M to a driving mode in which the task imposed on the occupant is heavier when the task related to the determined driving mode is not executed by the driver.

For example, when the host vehicle M is in a state in which mode A can be executed (a mode A ready state) while mode B (or C to E) is being executed, the mode determiner 150 causes the HMI controller 170 to execute control for inquiring the driver about whether or not mode switching to mode A is performed using the HMI 30. The mode determiner 150 determines that the driving mode is switched to mode A when the status of the host vehicle M satisfies a predetermined condition after an instruction (approval) to switch to mode A is received.

The mode determiner 150, for example, causes the HMI controller 170 to execute control for requesting the driver to shift to the manual driving in the mode E using the HMI 30 when the driver is in a posture in which the driver cannot shift to manual driving in response to a request from the system while mode A is being executed (for example, when the driver continues to look out of an allowable area or when a sign of difficulty in driving is detected). When the driver does not respond even after a predetermined time has elapsed after the HMI controller 170 is caused to execute control for a request for shift to the manual driving or when it is estimated that the driver does not perform the manual driving, the mode determiner 150 performs control to stop the host vehicle M in a target position through automated driving, and stop (end) the automated driving after the stopping. After the automated driving is stopped, the host vehicle M enters mode D or E, and the host vehicle M can be started by a manual operation of the driver. Hereinafter, the same applies to "Stop automated driving".

In mode B, when the driver is not monitoring the front side, the mode determiner 150 performs control to request the driver to monitor the surroundings using the HMI 30, and to cause the host vehicle M to be stopped in the target position and stop automated driving when the driver does not respond. When the driver is not monitoring the front side in mode C or is not gripping the steering wheel 82, the mode determiner 150 performs control to request the driver to perform surroundings monitoring and/or grip the steering wheel 82 using the HMI 30, and to cause the vehicle M to be stopped in the target position and stop the automated driving when the driver does not respond. In mode C or mode D, when the lane changing is not executed while the host vehicle M reaches a predetermined point, control is performed to cause the host vehicle M to be stopped in the target position and stop automated driving.

The driver status determiner 152 determines whether or not the driver is in a state suitable for driving. For example, the driver status determiner 152 monitors the status of the driver for the mode changing, and determines whether or not the status of the driver is a state corresponding to the task. For example, the driver status determiner 152 analyzes an image captured by the driver monitor camera 70 to perform posture estimation processing, and determines whether or not the driver is in a posture in which the driver cannot shift to manual driving in response to a request from the system. The driver status determiner 152 analyzes the image captured by the driver monitor camera 70 to perform line-ofsight estimation processing, and determines whether or not the driver is monitoring the surroundings (more specifically, the front side) of the host vehicle M. When it is determined that the status of the driver is not the state corresponding to the task during a predetermined time or more, the driver status determiner 152 determines that the driver is in a state unsuitable for an operation of the task. When it is determined that the status of the driver is the state corresponding to the task, the driver status determiner 152 determines that the driver is in a state suitable for the operation of the task. The driver status determiner 152 may determine whether or not the driver is in a state in which driving can be changed.

The surroundings environment determiner 154 determines whether or not the surroundings environment of the host vehicle M satisfies a predetermined condition for execution of a target driving mode. The predetermined condition is, for example, whether or not there are other vehicles (including a preceding vehicle), a road type (an expressway or overtaking lane) of a road on which a vehicle travels, whether or not a mode is an executable mode, whether or not there is merging or branching, a toll gate, or the like, or whether there is a change in a speed limit for a traveling lane of a vehicle due to construction work or other road situations.

The vehicle status determiner 156 determines a traveling status of the host vehicle M. Examples of the traveling status of the host vehicle M include a current driving mode of the host vehicle M, a traveling distance in the same lane of the host vehicle M, a traveling time, a position of the vehicle M on a road, a speed. The traveling status of the host vehicle M includes, for example, presence or absence of an intention to perform lane changing by the driver, a lighting state of a winker, a timing when the intention to perform lane changing is detected, a timing when the winker lights up, and a position in which lane changing to an adjacent lane is completed. The vehicle status determiner 156 may acquire information on content of predetermined information that is output to the HMI 30 by the HMI controller 170 or information on a timing when the information is output.

The mode determiner 150 determines the driving mode of the host vehicle M based on determination results of the driver status determiner 152, the surroundings environment determiner 154, and the vehicle status determiner 156. The mode determiner 150 determines a driving mode in which a task imposed on the driver is lighter than that in the current driving mode can be executed, based on the determination results of the driver status determiner 152, the surroundings environment determiner 154, and the vehicle status determiner 156. When it is determined that the vehicle M is in a state in which the driving mode can be executed, the mode determiner 150 causes the action plan generator 140 and the second controller 160 to execute the acceleration or deceleration control of the host vehicle M according to a condition for switching to the driving mode. The mode determiner 150 inquires the driver about whether or not to switch the driving mode in a state in which the host vehicle M reaches a speed at which switching to the driving mode can be performed, and determines that switching to the driving mode is performed when an instruction (approval) to switch the mode is received from the driver.

The mode changing processor 158 performs various processing for changing to the mode determined by the mode determiner 150. For example, the mode changing processor 158 causes the HMI controller 170 to control the HMI 30 in order to request the driver to perform a predetermined operation, sends an instruction to generate a target trajectory for stopping the automated driving, or sends an operation instruction to a driving assistance device (not illustrated). When it is determined that the driving mode in which the task imposed on the driver is lighter than that in the current driving mode can be executed, the mode changing processor 158 executes acceleration or deceleration control, or the like of the host vehicle M in order to switch to the mode. When the mode changing processor 158 executes various processing for executing the mode when an instruction (approval) to switch the driving mode of the host vehicle M to a predetermined mode is received by the mode changeover SW 36A.

The second controller 160 controls the travel driving force output device 200, the brake device 210, and the steering device 220 so that the host vehicle M passes through the target trajectory generated by the action plan generator 140 at a scheduled time.

The second controller 160 includes, for example, an acquirer 162, a speed controller 164, and a steering controller 166. The acquirer 162 acquires information on the target trajectory (trajectory points) generated by the action plan generator 140 and stores the information on the target trajectory in a memory (not shown). The speed controller 164 controls the travel driving force output device 200 or the brake device 210 based on a speed element incidental to the target trajectory stored in the memory. The steering controller 166 controls the steering device 220 according to a bent state of the target trajectory stored in the memory. Processing of the speed controller 164 and the steering controller 166 is realized by, for example, a combination of feedforward control and feedback control. For example, the steering controller 166 executes a combination of feedforward control according to a curvature of a road in front of the host vehicle M and feedback control based on a deviation from the target trajectory.

The HMI controller 170 notifies the driver of the host vehicle M of predetermined information using the HMI 30. The predetermined information includes, for example, driving assistance information. For example, the HMI controller 170 may generate an image including the above-described predetermined information and causes the generated image to be displayed on the display device of the HMI 30 or may generate a voice indicating the predetermined information and causes the generated voice to be output from the speaker of the HMI 30. The HMI controller 170 may output the information received by the HMI 30 to the communication device 20, the navigation device 50, the first controller 120, and the like.

The travel driving force output device 200 outputs a travel driving force (torque) for traveling of the vehicle to driving wheels. The travel driving force output device 200 includes, for example, a combination of an internal combustion engine, an electric motor, a transmission, and the like, and an electronic control unit (ECU) that controls these. The ECU controls the above configuration according to information input from the second controller 160 or information input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor according to the information input from the second controller 160 or the information input from the driving operator 80 so that a brake torque according to a braking operation is output to each wheel. The brake device 210 may include a mechanism that transfers the hydraulic pressure generated by an operation of the brake pedal included in the driving operator 80 to the cylinder via a master cylinder, as a backup. The brake device 210 is not limited to the configuration described above and may be an electronically controlled hydraulic brake device that controls an actuator according to the information input from the second controller 160 and transfers the hydraulic pressure of the master cylinder to the cylinder.

The steering device 220 includes, for example, a steering ECU and an electric motor. The electric motor, for example, changes directions of steerable wheels by causing a force to act on a rack and pinion mechanism. The steering ECU drives the electric motor according to the information input from the second controller 160 or the information input from the steering wheel 82 of the driving operator 80 to change the directions of the steerable wheels.

[Driving Control Before and After Mode Switching]

Hereinafter, driving control before and after the mode switching in the first embodiment will be specifically described. Hereinafter, some examples of driving control before and after switching from mode B to mode A (independent automated driving mode) will be separately described. Hereinafter, information output from the HMI 30 under the control of the HMI controller 170 at the time of mode switching will also be described. Hereinafter, it is assumed that the driver status determiner 152 determines that the status of the driver is a state suitable for driving after mode switching. In the following description, it is assumed that "the host vehicle M reaches a point P" means, for example, that the reference point (for example, a front end portion) of the host vehicle M reaches a line extending in a road width direction from the point P on the road.

<First Driving Control>

Figure 4:
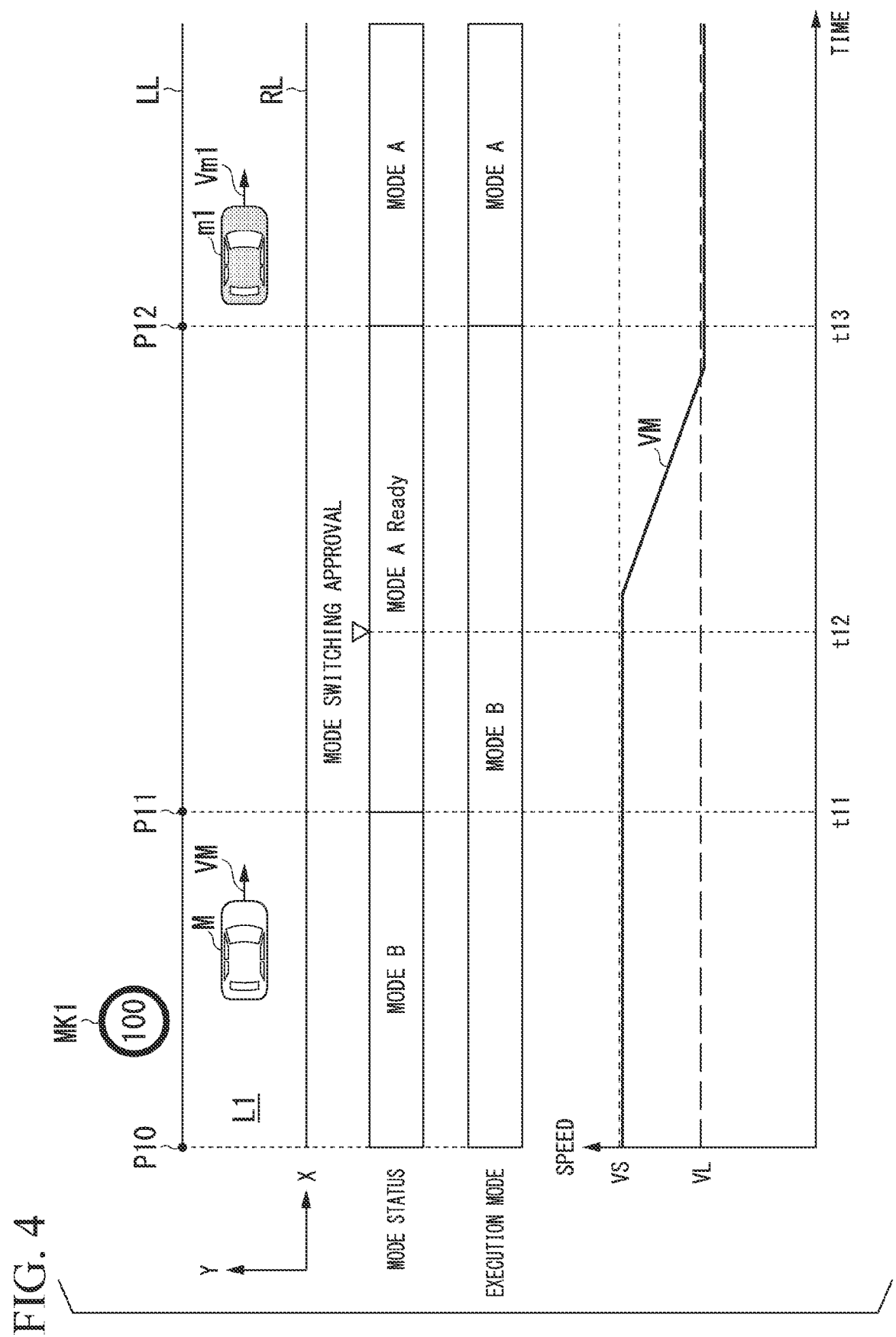
FIG. 4 is a diagram illustrating first driving control before and after mode switching.

FIG. 4 is a diagram illustrating first driving control before and after mode switching. In an example of FIG. 4, the host vehicle M traveling in a lane L1 partitioned by road demarcation lines RL and LL at a speed VM, a mode status during traveling, an execution mode of the host vehicle M, and a state of speed change over time before and after mode switching are shown. The mode status is, for example, information on a mode that is being executed and a mode that can be executed. The execution mode is, for example, a mode that the host vehicle M is executing. In the example of FIG. 4, it is assumed that an X-axis direction is a traveling direction of the lane L1 and a Y-axis direction is substantially a width direction of the lane L1. In the example of FIG. 4, it is assumed that the lane L1 is an expressway and the speed limit (maximum speed or upper limit speed) based on the legal speed is 100 [km/h]. For the lane L1, 50 [km/h] may be set as a minimum speed (lower limit speed) based on the legal speed. The speed information may be acquired from, for example, a road sign MK1 installed around the lane L1 included in the image captured by the camera 10 or may be acquired from road information corresponding to the position information by referring to map information (the second map information 62) based on the position information of the host vehicle M. It is assumed that a preceding vehicle (an example of another vehicle) m1 is traveling in front of the host vehicle M at a speed Vm1. In the example of FIG. 4, it is assumed that the host vehicle M does not perform follow-up traveling for follow-up of the preceding vehicle m1. In the example of FIG. 4, it is assumed that a time t11 is earliest and times are late in order of time t12 and time t13.

In a road section from P10 to P11 illustrated in FIG. 4, the host vehicle M travels in mode B. In mode B, the automated driving controller 100 generates a target trajectory so that the speed VM of the host vehicle M reaches a set speed VS (for example, 120 [km/h]) set by the speed setting SW 36B, and performs acceleration or deceleration control along the generated target trajectory to cause the host vehicle M to travel. Here, "the speed VM reaches an ∘∘ speed" means that, for example, a speed error between the speed VM and the ∘∘ speed is smaller than a threshold value, and may include that the speed VM does not exceed the ∘∘ speed (is equal to or smaller than the ∘∘ speed). Examples of the ∘∘ speed include the set speed VS, the target speed, and the speed limit.

For example, when only some of a plurality of conditions for switching to mode A (specifically, an independent automated driving mode) are not satisfied and the other conditions are satisfied, the mode determiner 150 determines that the host vehicle M is in a state in which mode A can be executed (mode A ready state). The following conditions (A) to (F) (a traveling environment) are included in, for example, the plurality of conditions for switching to mode A (independent automated driving mode), but other conditions may be included or may be replaced with the other conditions.

(A) The traveling lane of the host vehicle M can be recognized over a first predetermined distance or more.

(B) An obstacle does not exist within a second predetermined distance from the host vehicle M.

(C) An execution prohibition section for mode A (for example, merging or branching, a toll gate, or a construction section) does not exist within a third predetermined distance from the host vehicle M.

(D) The host vehicle M is traveling in the traveling lane at a constant speed (a predetermined speed error may be included in the constant speed) a predetermined distance or more or during a predetermined time or more.

(E) An instruction (approval) to switch a mode is received from the driver.

(F) The speed of the host vehicle M reaches the target speed.

Some of the conditions are, for example, the condition (E). Some of the conditions may include the condition (F), in addition to the above (E). The target speed in the above (F) is, for example, a speed within a legal speed for the traveling lane of the host vehicle M and, specifically, is a speed that is set in a speed range from the minimum speed to the maximum speed (speed limit) of the traveling lane. In the case of the lane L1, the target speed is set, for example, as 50 to 100 [km/h]. Hereinafter, it is assumed that the target speed is a speed limit (maximum speed) VL.

When it is determined that the host vehicle M is in a state in which mode A can be executed, the mode changing processor 158 causes the HMI controller 170 to output information indicating that the host vehicle M is in a state in which mode A can be executed, to the HMI 30. In this case, the HMI controller 170 may cause an image showing that the host vehicle M is in a state in which mode A can be executed to be displayed on the display device 32, and causes a voice indicating the host vehicle M is in a state in which mode A can be executed to be output from the speaker 34. Hereinafter, description will be given using an example in which an image is displayed on the display device 32.

Figure 5:
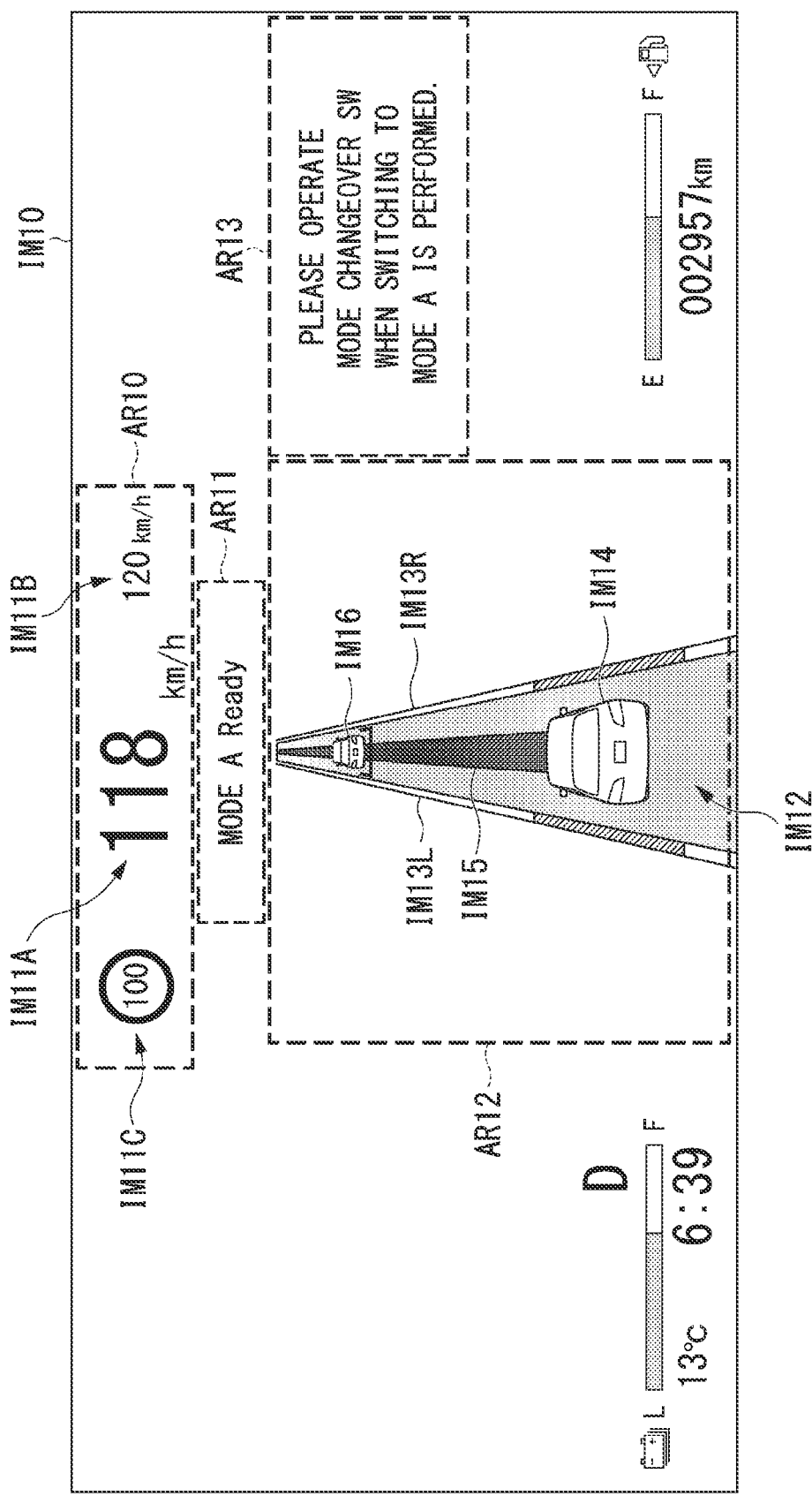
FIG. 5 is a diagram illustrating an example of an image showing that mode A can be executed.

FIG. 5 is a diagram illustrating an example of an image IM10 showing that mode A can be executed. The image IM10 includes, for example, a speed information display area AR10, a mode status display area AR11, a surroundings situation display area AR12, and a notification content display area AR13. Content, layout, and the like displayed on the image IM10 are not limited to the example in FIG. 5. The same applies to examples of other images that will be described below.

An image IM11A showing the speed VM of the host vehicle M detected by the vehicle sensor 40 or the like, an image IM11B showing the set speed VS of the host vehicle M, and an image IM11C showing a speed limit VL, for example, are displayed in the speed information display area AR10. An image showing the mode status is displayed in the mode status display area AR11. In the example of FIG. 5, a text "Mode A Ready" indicating that the host vehicle M is in a state in which mode A can be executed is displayed in the mode status display area AR11 while mode B is being executed. When the host vehicle M is not in a state in which mode A can be executed, a text such as "mode B" is displayed. Detailed information on the mode (for example, the TJP mode of mode A or an ACC mode of mode B) may be displayed in the mode status display area AR11.

A first layer image IM12 imitating the lane L1 is displayed in the surroundings situation display area AR12. Second layer images IM13L and IM13R imitating the road demarcation lines LL and LR that partition the lane L1 may be included in the first layer image IM12. Another lane (for example, an adjacent lane, a branch, or an alternating lane), for example, may be included in the first layer image IM12. In the surroundings situation display area AR12, a third layer image IM14 imitating the host vehicle M is superimposed and displayed on the first layer image IM12 in association with a position of a traveling lane in which the host vehicle M actually exists. For example, when the host vehicle M is executing LKAS, parts or all of the second layer images IM13L and IM13R may be displayed in a display aspect indicating that each of the road demarcation lines can be recognized. The display aspect is, for example, a color, a shape, a pattern, a gradation, the presence or absence of blinking, the presence or absence of an animation image. In the example of FIG. 5, parts of the second layer images IM13L and IM13R on the left and right of a display position of the third layer image IM14 are displayed in a display aspect different from others. Accordingly, it is possible to notify the occupant that the host vehicle M recognizes the road demarcation lines LL and LR.

A fourth layer image IM15 imitating a future target trajectory of the host vehicle M generated by the action plan generator 140 is displayed in a display aspect allowing the fourth layer image IM15 to be identified from the first layer image IM12 in the surroundings situation display area AR12. The display aspect is, for example, a color, a shape, a pattern, a gradation, the presence or absence of blinking, or the presence or absence of an animation image. When another vehicle exists around the host vehicle M, a fifth layer image IM16 imitating the other vehicle may be displayed in the surroundings situation display area AR12. In this case, the fifth layer image IM16 is displayed in a position associated with the third layer image IM14 based on a relative position between the host vehicle M and the other vehicle.

An image for requesting the driver to execute a predetermined operation or notifying the occupant of the status of the host vehicle M is displayed in the notification content display area AR13. In the example of FIG. 5, a text image for notifying that the mode changeover SW 36A needs to be operated when switching to mode A is performed is displayed. Information according to an execution condition for each mode, such as "Please monitor surroundings in a correct posture" or "Please grip a steering wheel", may be displayed in the notification content display area AR13.

In the image IM10, an image showing other driving assistance information (for example, a shift status, an amount of remaining energy, and driving mode of the host vehicle M), or other information (for example, an outside air temperature, and a time) may be included, in addition to the images displayed in the above-described areas.

The HMI controller 170 displays the image IM10 illustrated in FIG. 5 on the display device 32 at a timing (time t11) when the host vehicle M reaches the point P11 illustrated in FIG. 4 at which the host vehicle M is in a state in which mode A can be executed. When an operation of approval for mode switching is received from the driver by the mode changeover SW 36A in a state in which the image IM10 is displayed on the display device 32, the mode changing processor 158 causes the action plan generator 140 to generate a target trajectory for deceleration control so that the speed VM of the host vehicle M reaches the target speed for switching to mode A from the set speed VS (does not exceed the speed limit (maximum speed)).

The HMI controller 170 causes the HMI 30 to output information indicating that vehicle control (for example, acceleration or deceleration control) for switching to mode A is performed between the time t12 when an operation of approval for the switching of mode A is received from the driver and a time until the speed VM of the host vehicle M becomes equal to or smaller than the speed limit VL.

Figure 6:
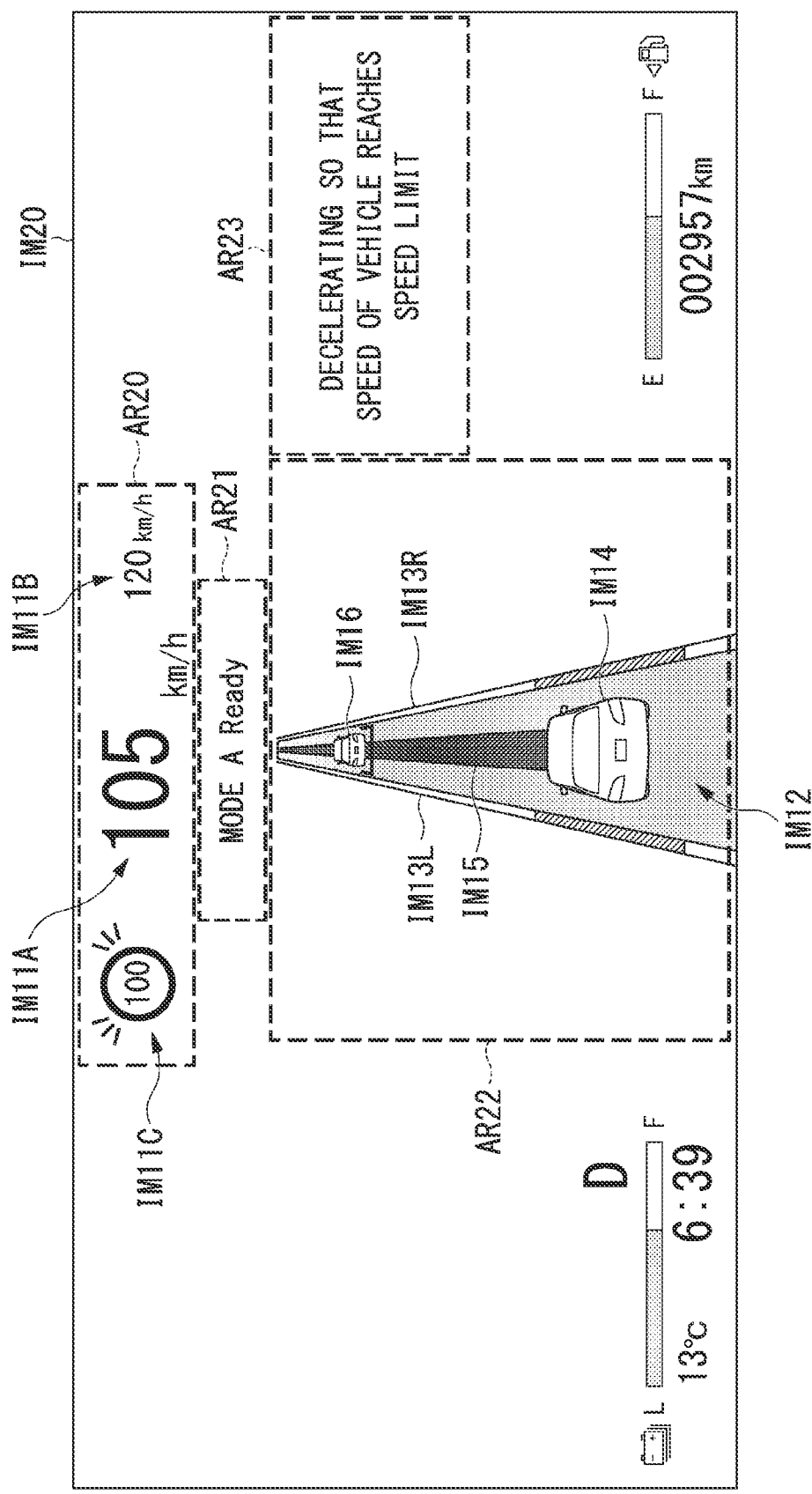
FIG. 6 is a diagram illustrating an example of an image showing that deceleration control for switching to mode A is being performed.

FIG. 6 is a diagram illustrating an example of an image IM20 showing that deceleration control for switching to mode A is performed. A speed information display area AR20, a mode status display area AR21, a surroundings situation display area AR22, and a notification content display area AR23, for example, are included in the image IM20. Images IM11A to IM11C are displayed in the speed information display area AR20, as in the speed information display area AR10. In the image IM20, the HMI controller 170 may perform a display in a display aspect of the image IM11C showing the speed limit VL different from that of the image IM11C displayed on the image IM10. Specifically, the HMI controller 170 causes the image IM11C included in the image IM20 to blink, or highlights the image in a color, size, or the like different from that of the image IM11C included in the image IM10. This makes it easier for the driver to ascertain that the deceleration control is being performed toward the set speed VS.

Content and display aspects displayed in the mode status display area AR21 and the surroundings situation display area AR22 are the same as the content displayed in the mode status display area AR11 and the surroundings situation display area AR12 included in the image IM10 described above. An image showing content of current vehicle control is displayed in the notification content display area AR23. In the example of FIG. 6, a text image showing that the speed VM of the host vehicle M is decelerated to reach the speed limit VL is displayed in the notification content display area AR23. A text image showing that speed control for switching to mode A is being performed may be displayed in the notification content display area AR23. The HMI controller 170 can cause the driver to more accurately ascertain a status of the host vehicle M by causing the image showing the information described above to be displayed in the notification content display area AR23.

The mode determiner 150 switches to mode A at a timing when the speed VM of the host vehicle M reaches the speed limit VL and this state continues a predetermined distance or more or during a predetermined time or more (the time t13 or a timing when the host vehicle M reaches a point P12). In this case, the HMI controller 170 may cause an image showing that the driving mode is mode A to be displayed in the mode status display area AR21 and cause a text image such as "mode A is executed" or "mode A is being executed" to be displayed in the notification content display area AR23.

After the time t13, the driving controller executes the driving control so that a state satisfying an execution condition of mode A (for example, the conditions (A) to (F) described above) is continued. Therefore, for example, when the speed limit VL changes due to road construction, weather, other road situations, or the like (for example, when the speed limit VL changes from 100 [km/h] to 80 [km/h]), the driving controller performs the speed control so that the speed VM of the host vehicle M reaches the speed limit VL after changing, to cause mode A to be continued. In this case, the HMI controller 170 may cause the HMI 30 to output information indicating that speed control for causing mode A to be continued is being performed. When the execution condition cannot be satisfied by the driving control, such as when the execution prohibition section of mode A exists within the third predetermined distance, the mode determiner 150 performs switching to another appropriate mode.

<Second Driving Control>

Figure 7:
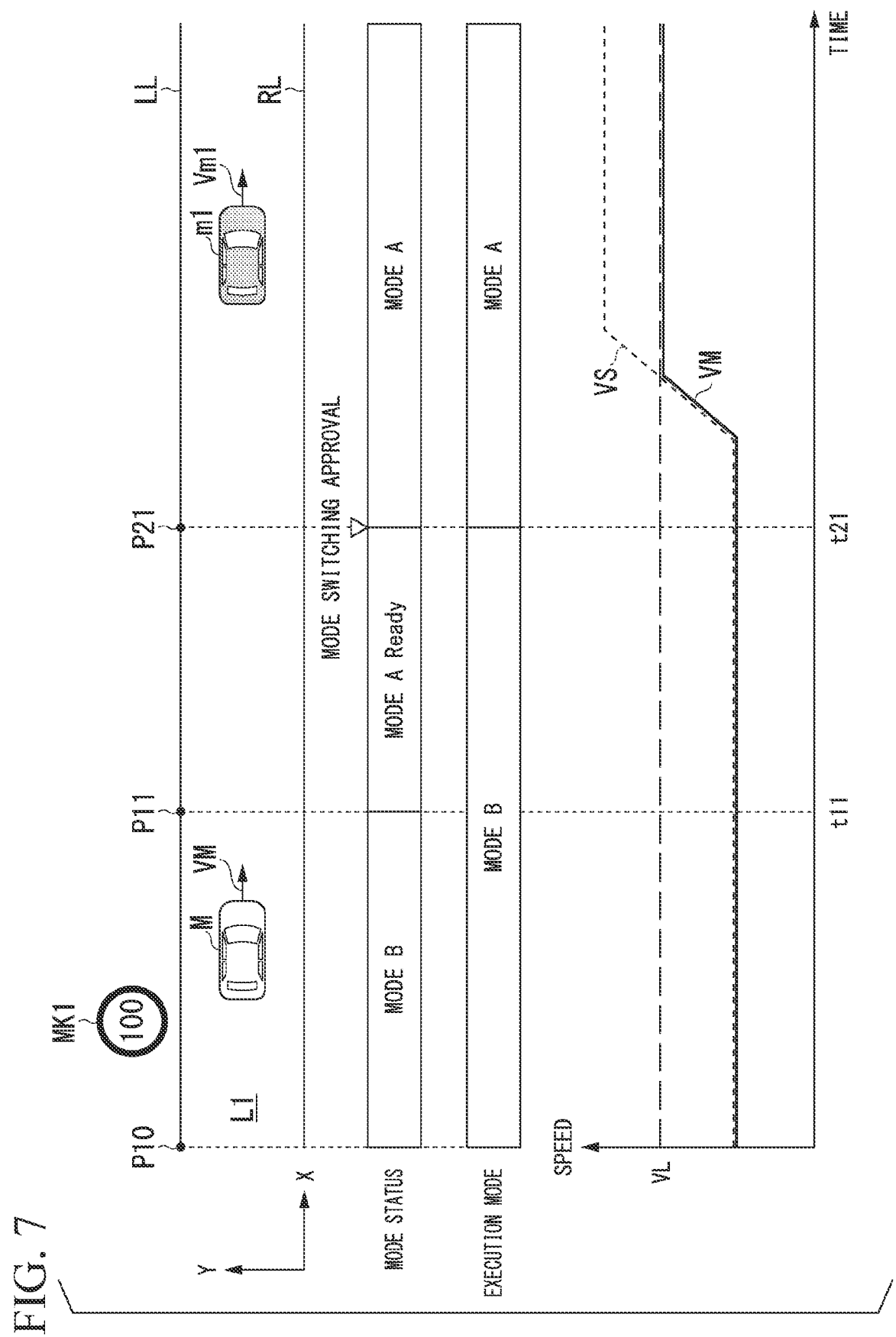
FIG. 7 is a diagram illustrating second driving control before and after mode switching.

FIG. 7 is a diagram illustrating second driving control before and after mode switching. The second driving control differs from the first driving control in that the set speed VS is smaller than the speed limit (maximum speed) VL. The set speed VS in this case is assumed to be larger than a minimum speed for the lane L1. In the second driving control, an example in which the driver sets the set speed VS of the host vehicle M to be larger than the speed limit VL through an operation of the speed setting SW 36B after the driving mode is switched to mode A is shown. In the example of FIG. 7, it is assumed that times are late in order of time t11 and time t21.

In the example of FIG. 7, when the host vehicle M is in a state in which mode A can be executed at a point in time at which the host vehicle M reaches the point P11, the HMI controller 170 causes the image IM10 to be output to the display device 32 of the HMI 30. Thereafter, when the instruction (approval) to switch the mode is received from the driver by the mode changeover SW 36A at a timing (time t21) when the host vehicle M reaches the point P21, the mode determiner 150 switches the driving mode to mode A in order to satisfy all the conditions (A) to (F).

Further, when an instruction to increase the set speed VS is received according to an operation of the speed setting SW 36B by the driver, the driving controller increases the speed of the host vehicle M with the increase in the set speed VS of the host vehicle M. When the set speed VS exceeds the speed limit VL, the driving controller controls the speed VM of the host vehicle M so that the speed is equal to or smaller than the speed limit VL. This makes it possible for the automated driving according to mode A to be continued even when the set speed VS is changed to be larger than the vehicle speed limit VL. Although, in the example of FIG. 7, the speed VM of the host vehicle M is increased with the increase in the set speed VS, a constant speed may be maintained instead of the speed VM being increased.

<Third Driving Control>

Figure 8:
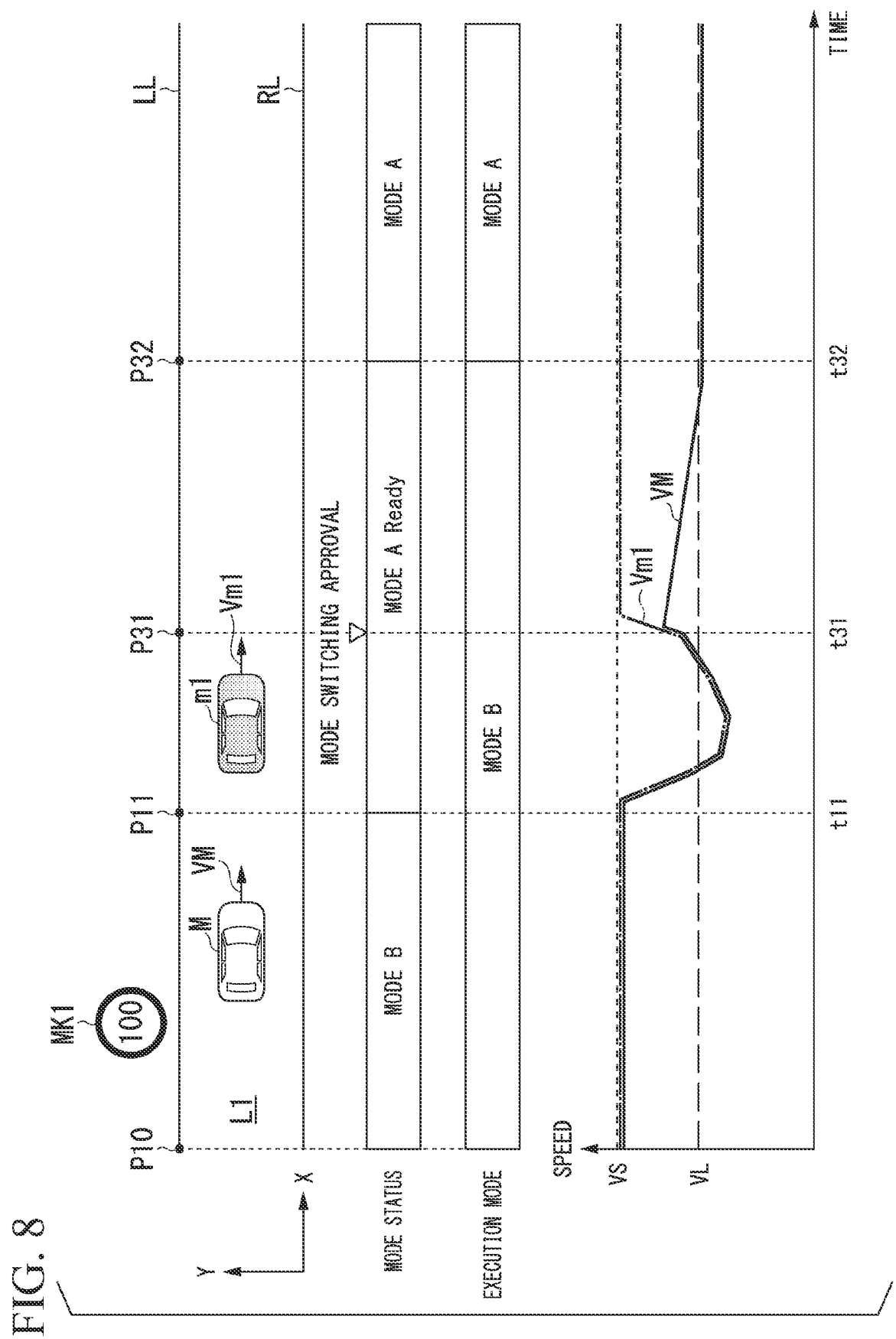
FIG. 8 is a diagram illustrating third driving control before and after mode switching.

FIG. 8 is a diagram illustrating third driving control before and after mode switching. The third driving control is driving control before and after switching to mode A (independent automated driving mode) is performed from a state in which the ACC in mode B is executed and the host vehicle M is traveling to keep a constant inter-vehicle distance from the preceding vehicle m1. In the example of FIG. 8, it is assumed that times are late in order of times t11, t31, and t32.

In the third driving control, the driving controller adjusts the speed VM of the host vehicle M in association with the speed Vm1 of the preceding vehicle m1 so that a distance between the host vehicle M and the preceding vehicle m1 reaches a predetermined interval. Here, when the host vehicle M is in a state in which mode A can be executed at the timing (time t11) when the host vehicle M reaches the point P11, the HMI controller 170 causes the image IM10 to be output to the display device 32 of the HMI 30. When the speed Vm1 of the preceding vehicle m1 decreases in a state in which the mode switching instruction by the mode changeover SW 36A is not received, the speed VM of the host vehicle M is also decreased based on an amount of decrease, and when the speed Vm1 increases, the speed VM is increased based on an amount of increase (times t11 to t31 in FIG. 8).

When an instruction to switch to mode A is received by an operation of the mode changeover SW 36A by the driver at a timing (time t31) when the host vehicle M reaches the point P31, the mode changing processor 158 executes deceleration control so that the speed VM of the host vehicle M is equal to or smaller than the speed limit VL of the lane L1. In the example of FIG. 8, since a speed of the other vehicle m1 increases and travels at a speed higher than the speed limit VL even when the host vehicle M performs deceleration control, a distance between the host vehicle M and the other vehicle m1 increases and, as a result, the host vehicle M travels alone. The HMI controller 170 causes the display device 32 to display the image IM20 illustrated in FIG. 6 while speed control of the host vehicle M is being performed (between time t31 and time t32). The mode determiner 150 switches to mode A and causes the host vehicle M to travel at a timing when the speed VM of the host vehicle M becomes equal to or smaller than the speed limit VL and this state continues a predetermined distance or more or during a predetermined time or more (the time t32 or timing when the host vehicle M reaches the point P32). In the third driving control, when the mode changeover SW 36A is not operated, the ACC mode in mode B is continuously executed.

Thus, according to the third driving control, even when the host vehicle M is traveling in the ACC mode in mode B, it is possible to switch the host vehicle M to mode A and cause the host vehicle M to travel in the independent automated driving mode.

<Fourth Driving Control>

Figure 9:
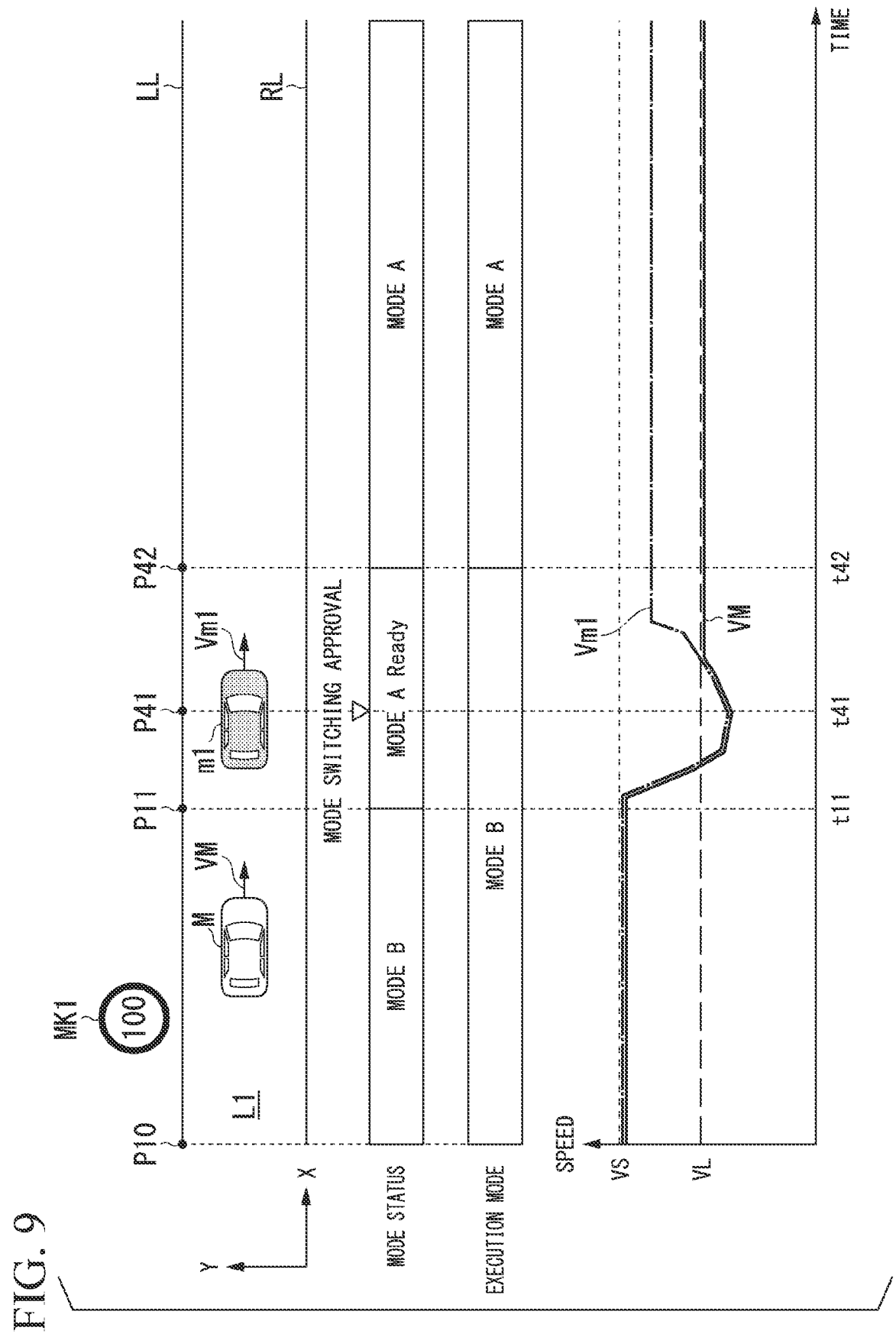
FIG. 9 is a diagram illustrating fourth driving control before and after mode switching.

FIG. 9 is a diagram illustrating a fourth driving control before and after mode switching. The fourth driving control differs from the third driving control in that a mode switching approval is received by the mode changeover SW 36A in a situation in which the speed VM of the host vehicle M is smaller than the speed limit VM. Hereinafter, differences will be mainly described. In the example of FIG. 9, it is assumed that times are late in order of times t11, t41, and t42.

In the example of FIG. 9, it is assumed that the host vehicle M enters a state in which mode A can be executed at the timing (time t11) when the host vehicle M reaches the point P11, and the instruction to switch to mode A is received by the mode changeover SW 36A at a timing (time t41) when the host vehicle M reaches a point P41. In this case, the driving controller adjusts the speed VM of the host vehicle M to follow the preceding vehicle m1 based on the speed Vm1 of the preceding vehicle m1 until the speed Vm1 of the preceding vehicle m1 exceeds the speed limit VL, and adjusts the speed VM so that the speed VM becomes equal to or smaller than the speed limit VL at a timing when the speed Vm1 of the preceding vehicle m1 exceeds the speed limit VL. The mode determiner 150 performs switching to mode A and causes the host vehicle M to travel at a timing when the speed VM becomes equal to or smaller than the speed limit VL and this state continues a predetermined distance or more or during a predetermined time or more (the time t42 or a timing when the host vehicle M reaches a point P42). Thus, according to the fourth driving control, it is possible to cause mode A to be continued even when the speed of the preceding vehicle m1 exceeds the speed limit VL, in addition to achieving the same effects as those of the third driving control.

In the first embodiment, it is possible to more appropriately execute the driving control in which the task imposed on the driver is light under various situations, as shown in the first to fourth driving controls described above. In each of the first to fourth driving controls, the mode determiner 150 may curb the execution (switching) of mode A when a minimum speed (lower limit speed) is set for the traveling lane (the lane L1) of the host vehicle M and the speed VM of the host vehicle M is smaller than the minimum speed for the lane L1. Accordingly, it is possible to curb traffic congestion due to a low speed. When the minimum speed is set for the lane L1 and the speed VM of the host vehicle M becomes smaller than the minimum speed after mode A is executed, the mode determiner 150 may continue mode A. Accordingly, it is possible to curb frequent switching of mode A due to acceleration or deceleration. It is possible to perform changing from the independent automated driving mode to the TJP mode while continuing mode A.

Processing Flow of First Embodiment

Figure 10:
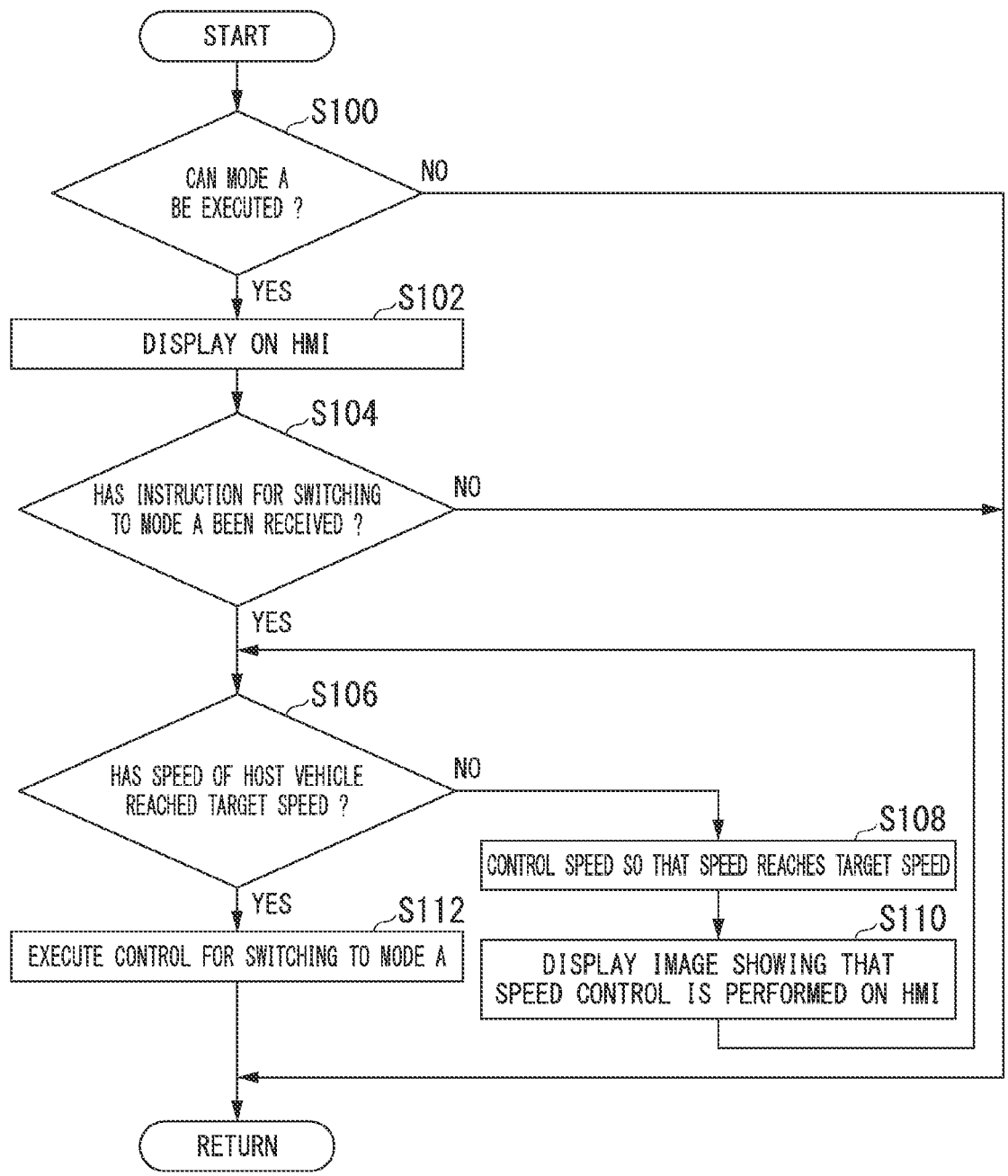
FIG. 10 is a flowchart illustrating an example of a flow of processing that is executed by the automated driving controller of the first embodiment.

FIG. 10 is a flowchart illustrating an example of a flow of processing that is executed by the automated driving controller 100 of the first embodiment. In the example of FIG. 10, a mode switching process from mode B to mode A among processes that are executed by the automated driving controller 100 will be mainly described.

In the example of FIG. 10, the mode determiner 150 determines whether or not the host vehicle M is in a state in which mode A can be executed (a mode A ready state) based on determination results of the driver status determiner 152, the surroundings environment determiner 154, and the vehicle status determiner 156 (step S100). When it is determined that the host vehicle M is in a state in which mode A can be executed, the HMI controller 170 causes the HMI 30 to display an image showing that mode A can be executed (step S102).

Then, the mode determiner 150 determines whether or not the mode switching instruction has been received by an operation of the mode changeover SW 36A by the driver (step S104). When the mode determiner 150 determines that the instruction for switching to mode A has been received, the mode determiner 150 determines whether or not the speed VM of the host vehicle M has reached the target speed (step S106). When it is determined that the speed VM of the host vehicle M has not reached the target speed, the action plan generator 140 controls the speed of the vehicle M so that the speed VM of the host vehicle M reaches the target speed (step S108). Then, the HMI controller 170 causes the display device 32 of the HMI 30 to display an image showing that the host vehicle M is performing speed control (vehicle control) (step S110). After the processing of step S110, the process returns to the processing of step S106.

When it is determined in the processing of step S106 that the speed VM of the host vehicle M is the target speed, the mode determiner 150 determines that mode A is to be executed and executes control for switching to mode A (step S112). In the processing of S112, when it is determined that the speed VM of the host vehicle M has reached the target speed, the mode determiner 150 may execute the control for switching to mode A in a case in which the vehicle M travels in the traveling lane over the predetermined distance or more or for the predetermined time or more in a state in which the vehicle M reaches the target speed. Thus, the processing of the present flowchart ends.

When it is determined in the processing of step S100 that the host vehicle M is not in a state in which mode A can be executed, or when it is determined in the processing of step S104 that the instruction for switching to mode A is not received at a point in time within a predetermined time after the display on the HMI 30 or at a point in time when the vehicle M travels a predetermined distance, the processing of the present flowchart ends. In this case, the driving controller continuously executes mode B that is currently being executed.

According to the first embodiment described above, when the host vehicle M can execute driving control according to mode A, the driver is notified of this and then, control for switching to mode A is performed when the instruction (approval) to switch to mode A is received, so that mode A can be started based on an intention of the driver. Therefore, it is possible to curb driver's anxiety due to execution of acceleration or deceleration control of the host vehicle M for switching to mode A against the intention of the driver and to more appropriately execute driving control in which a task imposed on the driver is light.

Second Embodiment

Next, a driving control device according to a second embodiment will be described. The driving control device in the second embodiment differs from the driving control device in the first embodiment in that control is performed so that the speed VM of the host vehicle M reaches the target speed by an operation of the driver, instead of the control being performed so that the speed VM of the host vehicle M reaches the target speed by the driving controller without depending on the operation of the driver after an instruction for switching to mode A is sent by the driver. The operation of the driver is, for example, the driver operating the driving operator 80 (a manual driving operation). The operation of the driver may include the driver operating the speed setting SW 36B. Hereinafter, the above differences will be mainly described. Since the vehicle system according to the second embodiment has the same configuration as the vehicle system 1 of the first embodiment, the second embodiment will be described using the vehicle system 1 as well.

In the second embodiment, the mode determiner 150 determines whether the host vehicle M is in a state in which the host vehicle M can execute mode A based on the determination results of the driver status determiner 152, the surroundings environment determiner 154, and the vehicle status determiner 156. When the host vehicle M is in a state in which mode A can be executed, the HMI controller 170 causes the display device 32 to display the image IM10.

Figure 11:
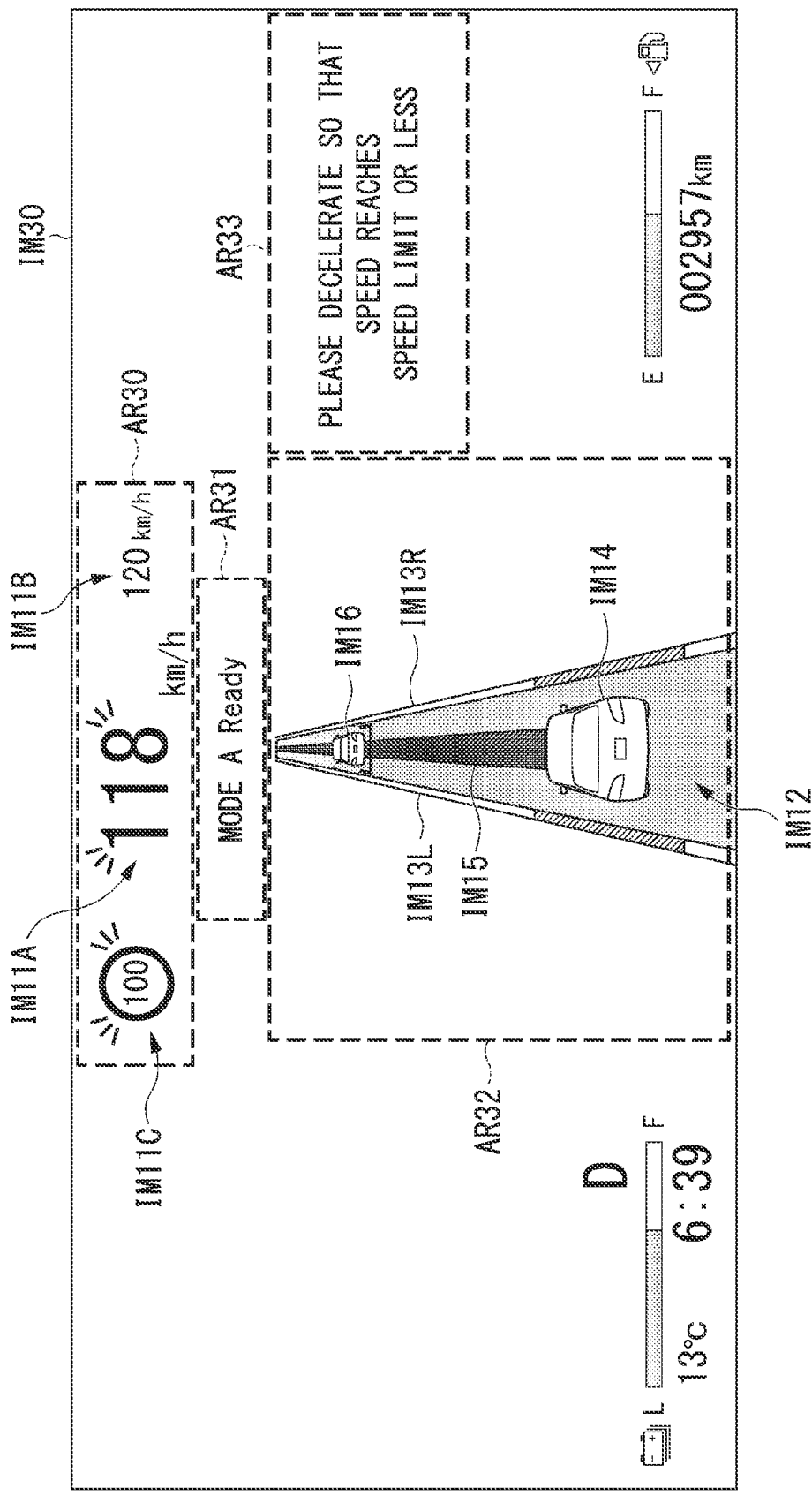
FIG. 11 is a diagram illustrating an example of an image for requesting a driver to adjust a speed of a host vehicle M.

When the mode switching instruction (approval) is received by the mode changeover SW 36A, the HMI controller 170 causes the HMI 30 to output information for requesting the driver to adjust the speed of the host vehicle M. FIG. 11 is a diagram illustrating an example of an image IM30 for requesting the driver to adjust the speed of the host vehicle M. A speed information display area AR30, a mode status display area AR31, a surroundings situation display area AR32, and a notification content display area AR33, for example, are included in the image IM30.

The same information as in the speed information display area AR10, the mode status display area AR11, and the surroundings situation display area AR12 included in the image IM10 are displayed in the speed information display area AR30, the mode status display area AR31, and the surroundings situation display area AR32. The HMI controller 170 displays the image IM11A showing the speed VM of the host vehicle M and the image IM11C showing the speed limit VL displayed in the speed information display area AR30 in a display aspect different from that of the image displayed on the image IM10. In the example of FIG. 11, the images IM11A and IM11C blink in the image IM30.

An image for requesting the driver to adjust the speed so that the speed VM of the host vehicle M becomes equal to or smaller than the speed limit VL is displayed in the notification content display area AR33. In the example of FIG. 11, a text image such as "Please decelerate the host vehicle M so that the speed becomes equal to or smaller than the speed limit" is displayed in the notification content display area AR33. This makes it possible for the driver to ascertain that the driver needs to perform speed control (acceleration or deceleration control) of the host vehicle M by himself or herself. After the image IM30 is displayed, the driver performs the speed control of the host vehicle M by operating the brake pedal, the accelerator pedal, or the like included in the driving operator 80 to perform speed control according to a manual driving or operating the speed setting SW 36B to set the set speed to the speed limit. The mode determiner 150 performs switching from mode B to mode A when the speed VM of the host vehicle M reaches the speed limit. The switching control in the second embodiment can be similarly executed under a situation shown in the first to fourth driving controls in the first embodiment described above. In the second embodiment, another switch (for example, a resume switch) regarding speed adjustment in the host vehicle M may be operated instead of the operation of the speed setting SW 36B by the driver. The resume switch is, for example, a switch that receives an instruction to execute speed control so that the speed of the host vehicle M reaches a set vehicle speed set in a previous time.

Processing Flow of Second Embodiment

Figure 12:
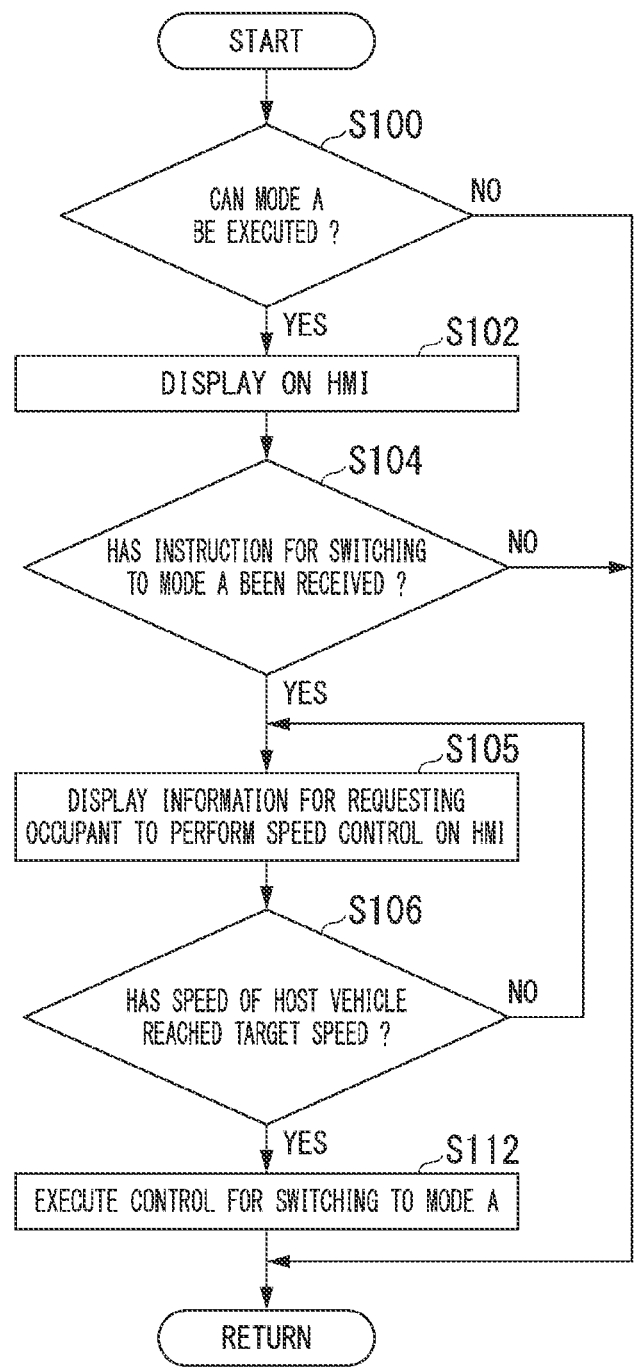
FIG. 12 is a flowchart illustrating an example of a flow of processing that is executed by an automated driving controller of the second embodiment.

FIG. 12 is a flowchart illustrating an example of a flow of processing that is executed by the automated driving controller 100 of the second embodiment. In the example of FIG. 12, the processing differs from the processing for switching to mode A (steps S100 to S112) in the first embodiment described above in that processing of step S105 are included between step S104 and step S106 instead of the processing of steps S108 to S110. Therefore, the processing of step S105 will be mainly described hereinafter.

In the processing of step S104, when it is determined that an instruction for switching to mode A has been received from the driver, the HMI controller 170 causes the HMI 30 to display an image (for example, the image IM30) for requesting the driver to perform the speed control of the host vehicle M (step S105). Next, the mode determiner 150 determines whether or not the speed of the host vehicle M is the target speed (step S106). When it is determined that the speed of the host vehicle M is not the target speed, the processing returns to the processing of step S105. When it is determined that the speed of the host vehicle M has been the target speed, the processing of step S112 is executed.

According to the second embodiment described above, it is possible to perform switching to a mode in which a task is light based on a more accurate intention of the driver by receiving the instruction (approval) to switch a mode from the driver using the mode changeover SW 36A and performing mode switching after executing the speed control of the host vehicle M by the driver, in addition to achieving the same effects as those of the first embodiment.

Third Embodiment

Next, a driving control device according to a third embodiment will be described. The driving control device in the third embodiment differs from that in the first embodiment in that the host vehicle M performs lane changing from the overtaking lane (passing lane) to a lane (a traveling lane or a slow lane) other than the overtaking lane when the host vehicle M is traveling in the overtaking lane, and then executes mode A. Therefore, the above difference will be described hereinafter. Since a vehicle system according to the third embodiment has the same configuration as the vehicle system 1 of the first embodiment, the third embodiment will be described using the vehicle system 1.

Figure 13:
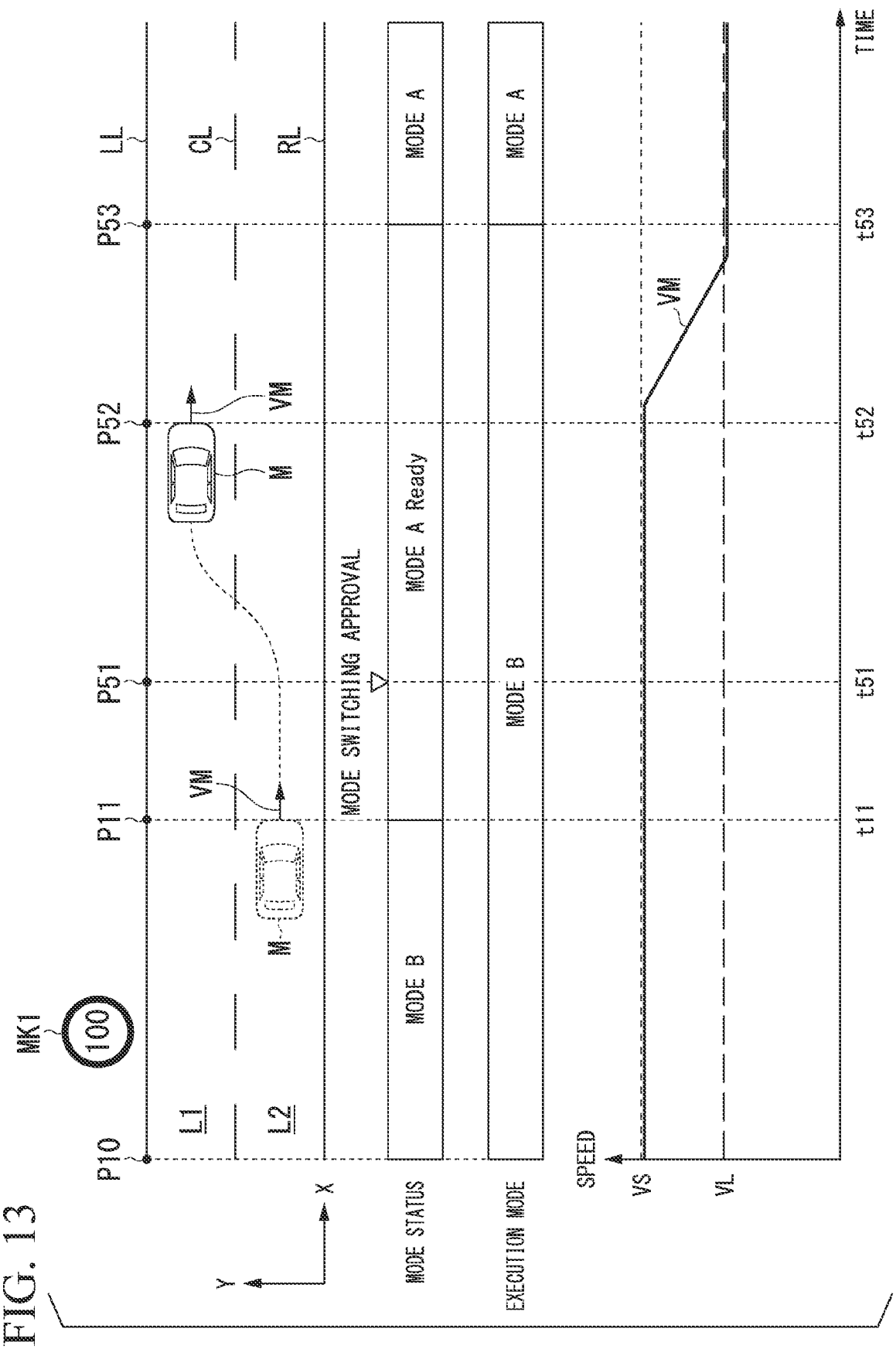
FIG. 13 is a diagram illustrating driving control before and after mode switching in a third embodiment.

FIG. 13 is a diagram illustrating driving control before and after mode switching in the third embodiment. In an example of FIG. 13, a scene in which the set speed VS is larger than the speed limit VL, deceleration is performed after mode switching approval, and mode switching is performed, as in the first driving control described above, is shown. The driving control according to the third embodiment can be applied to each of the second to fourth driving controls. In the example of FIG. 13, a road with two lanes L1 and L2 in which a vehicle can travel in the same direction (X-axis direction) is shown. The lane L1 is partitioned by road demarcation lines LL and CL, and the lane L2 is partitioned by the road demarcation line CL and a road demarcation line RL. It is assumed that the lane L1 is a traveling lane (slow lane) and the lane L2 is an overtaking lane (passing lane). The road demarcation line CL is a demarcation line indicating that lane changing can be performed between the lanes L1 and L2. In the example of FIG. 13, it is assumed that times are late in order of times t11, t51, t52, and t53. It is assumed that the host vehicle M is traveling in the overtaking lane at a time before the time t11 when it is determined that mode A can be executed.

In the third embodiment, the mode determiner 150 determines whether or not the vehicle M is in a state in which the vehicle M can execute mode A based on the determination results of the driver status determiner 152, the surroundings environment determiner 154, and the vehicle status determiner 156. When the host vehicle M is in a state in which mode A can be executed, the HMI controller 170 causes the display device 32 to display the image IM10.

Thereafter, when the mode switching instruction is received in the mode changeover SW 36A at a timing (time t51) when the host vehicle M reaches a point P51, the surroundings environment determiner 154 determines whether the lane L2 in which the host vehicle M is travelling is the overtaking lane or the traveling lane (a lane other than the overtaking lane). Specifically, the surroundings environment determiner 154 determines whether or not a lane in which the vehicle M is traveling is the overtaking lane from a road sign included in the image based on a result of analyzing the captured image from the camera 10. The surroundings environment determiner 154 may determine whether or not the vehicle M is traveling in the overtaking lane depending on which lane the host vehicle M is traveling in among a plurality of lanes included in a road. In this case, the surroundings environment determiner 154, for example, may determine that the host vehicle M is traveling in an overtaking lane when the host vehicle M travels in a rightmost lane among a plurality of lanes in which the host vehicle M can travel in the same direction in a road to which a left-hand traffic regulation is applied, and may determine the host vehicle M is traveling in a traveling lane (a lane other than the overtaking lane) when the host vehicle M travels in a lane other than the rightmost lane. The surroundings environment determiner 154 may refer to the map information based on the position information of the host vehicle M to determine whether or not a lane corresponding to the position of the host vehicle M is the overtaking lane.

When it is determined that the lane in which the host vehicle M is traveling is the overtaking lane, the mode determiner 150 causes the action plan generator 140 to perform lane changing (ALC) of the host vehicle M from the lane L2 to the lane L1 that is the traveling lane. When the lane changing is executed, the HMI controller 170 may cause the HMI 30 to output information indicating that the lane changing is being performed for switching to mode A.

Thereafter, the mode determiner 150 decelerates the host vehicle M at a timing when the lane changing to the lane L1 is completed (a timing when a time t52 or a point P52 is reached). "The lane changing to the lane L1 is completed" may mean, for example, that a center (or a centroid) of the vehicle M travels at a center of the lane L1 or may means that all the wheels of the host vehicle M exist within the lane L1. The mode determiner 150 performs control for switching the driving mode of the host vehicle M to mode A at a timing when a state in which the speed VM of the host vehicle M is constant at the speed limit VL or less continues for a predetermined time or more or a predetermined distance or more (the time t53 or a timing when the host vehicle M reaches a point P53). Accordingly, it is possible to curb congestion of the overtaking lane because the deceleration for switching to mode A is not performed in the overtaking lane.

Although, in the above-described example, the mode determiner 150 performs deceleration control after the host vehicle M is caused to perform lane changing from the lane L2 to the lane L1, deceleration to the target speed in the lane L2 is first performed and then, lane changing to the lane L1 is performed, for example, in a situation in which there is no following vehicle of the host vehicle M. The mode determiner 150 may perform lane changing from the lane L2 to the lane L1 while performing deceleration control. For example, the mode determiner 150 may adjust a timing when speed control is performed based on a surroundings situation of the host vehicle M, an instruction of the occupant, or the like.

In the third embodiment, after the mode switching is approved by the driver, the HMI controller 170 may cause the HMI 30 to output information for causing the driver to execute one or both of the lane changing and the deceleration. In this case, the mode determiner 150 executes the switching to mode A after one or both of the lane changing to the lane L1 and the deceleration instructed by an operation of the driver are executed.

In the lane changing control according to the third embodiment, when lane changing from the overtaking lane L2 to the traveling lane L1 cannot be performed due to a road situation such as congestion of the lane L1 or during construction, the mode determiner 150 may cause the current mode (mode B) to be continued without performing switching to mode A. For example, the mode determiner 150 determines that the lane changing from the overtaking lane L2 to the traveling lane L1 cannot be performed when the number of times the ALC to the lane L1 fails is equal to or larger than a predetermined number or when the ALC is not completed even when the vehicle travels a predetermined distance or more after the approval for switching to mode A by the driver is received.

When the switching to mode A has been stopped because lane changing cannot be performed, the HMI controller 170 displays a text image such as "Switch to mode A has been stopped because the lane changing cannot be performed" on the HMI 30. This makes it possible for the driver to accurately ascertain a reason why the execution of mode A has been stopped even though the switching to mode A is approved.

In a case in which the lane changing from the lane L2 to the lane L1 can be performed after the switching to mode A has been stopped, the mode determiner 150 may cause the HMI controller 170 to display information for inquiring the driver about whether or not to perform the switching to mode A again, and execute the lane changing, deceleration, and processing for switching to mode A when approval of the driver is received.

Processing Flow of Third Embodiment

Figure 14:
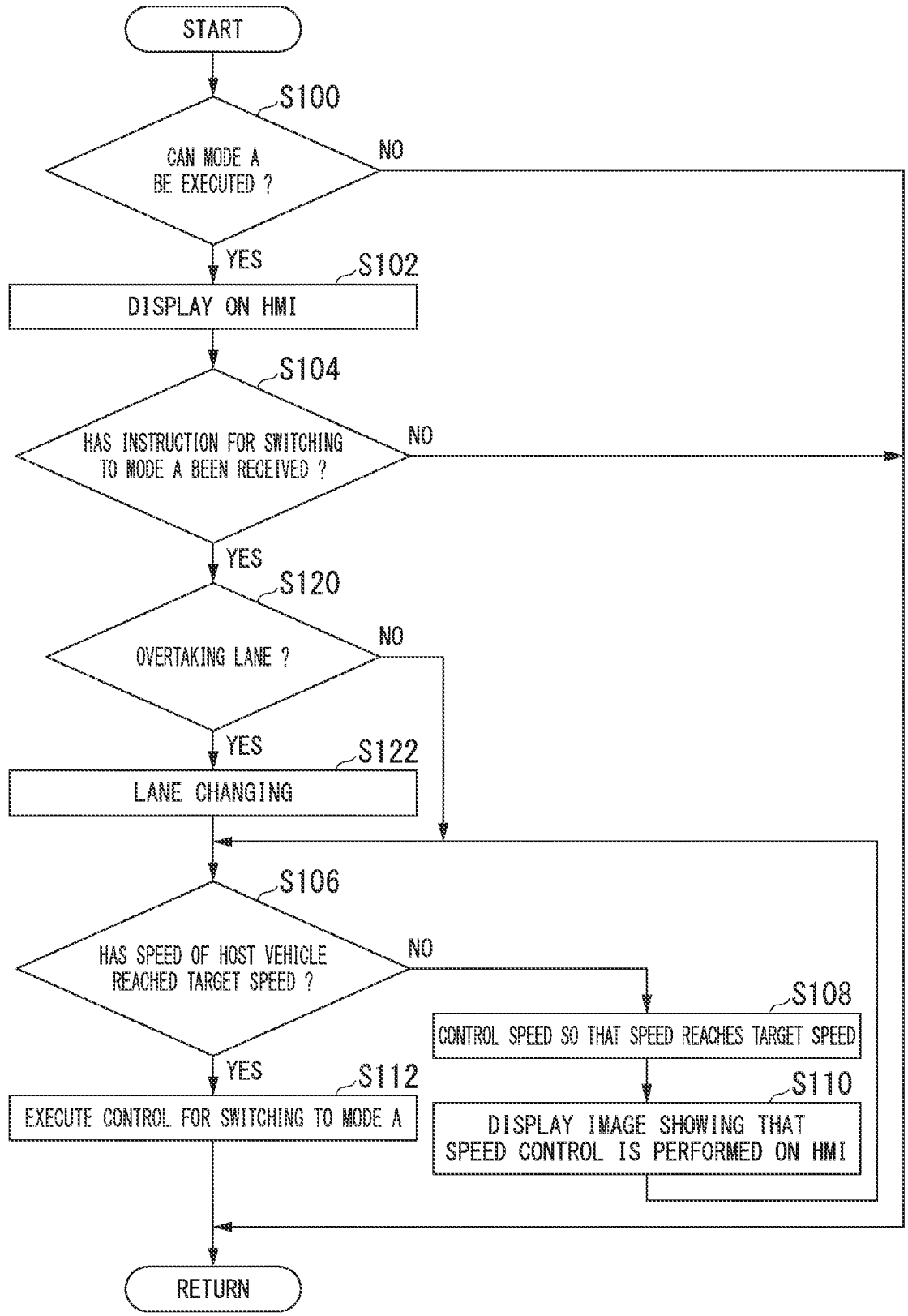
FIG. 14 is a flowchart illustrating an example of a flow of processing that is executed by an automated driving controller of the third embodiment.

FIG. 14 is a flowchart illustrating an example of a flow of processing that is executed by the automated driving controller 100 of the third embodiment. The processing illustrated in FIG. 14 differs from the processing of switching to mode A (steps S100 to S112) in the first embodiment described above in that processing of steps S120 to S122 is included between step S104 and step S106. Therefore, hereinafter, processing of steps S120 to S122 will be mainly described.

When it is determined in the processing of step S104 that an operation of switching to mode A by the driver has been received, the mode determiner 150 determines whether or not the lane in which the host vehicle M is traveling is the overtaking lane (step S120). When it is determined that the lane in which the host vehicle M is traveling is the overtaking lane, the lane changing to the traveling lane is performed (step S122). When the lane in which the host vehicle M is traveling is not the overtaking lane, or after the processing of step S122 is performed, the same processing as in steps S106 to S112 in the first embodiment is executed.

According to the third embodiment described above, it is possible to curb traffic congestion in the overtaking lane by performing lane changing to a lane other than the overtaking lane and then performing speed adjustment to switch to mode A after approval for the switching to mode A is received from the driver, in addition to achieving the same effects as those of the first embodiment. Therefore, it is possible to perform more appropriate vehicle control according to a situation.

Modification Examples

Each of the first to third embodiments described above may be a combination of some or all of the other embodiments. In the first to third embodiments described above, the driving mode is switched from mode B (the first driving mode) to mode A (the second driving mode) after speed control is performed so that the speed of the host vehicle M reaches the target speed, but the present invention is not limited thereto. For example, when switching from a state in which the host vehicle M is traveling in a lane with a speed limit of 100 [km/h] at a speed of 80 [km/h] in mode B to mode A is performed, the host vehicle M can also travel at 80 [km/h] in mode A and thus, switching to mode A may be performed only by operating the mode changeover SW 36A.

Whether or not speed control to the target speed described above is performed may be set by the occupant in advance or may be set according to a situation of the host vehicle M, a surroundings situation, and the like. The plurality of conditions for switching to mode A described above may be, for example, a condition that the speed VM of the host vehicle M is a predetermined speed range (for example, 50 to 90 [km/h]), in place of (or in addition to) at least one of the conditions (A) to (F) described above. In the first to third embodiments, when switching from mode B to mode A is performed, control such as decelerating the host vehicle M from the current speed VM by a predetermined speed range (for example, 10 [km/h]) and then starting switching control may be performed. According to the above-described embodiment, it is possible to more appropriately execute driving control in which the task imposed on the occupant is light under various situations with the vehicle control device including the recognizer 130 configured to recognize a surroundings situation of the vehicle M, the driving controller (the action plan generator 140 and the second controller 160) configured to control one or both of steering and acceleration or deceleration of the host vehicle M based on the surroundings situation recognized by the recognizer 130, and the mode changeover SW (an example of the first receiver) 36A configured to receive an operation of switching between driving modes by an occupant of the host vehicle M, in which the driving controller causes the host vehicle M to travel in any of a plurality of driving modes including the first driving mode and the second driving mode in which the task imposed on an occupant of the host vehicle M is lighter than that in the first driving mode, and the driving controller switches the driving mode from the first driving mode to the second driving mode after the speed of the vehicle M reaches the target speed when a traveling environment is such that the first driving mode is being executed and the second driving mode is able to be executed and when the operation of switching to the second driving mode is received by the mode changeover SW 36A.

Specifically, according to the above-described embodiments, it is possible to perform mode switching at a more appropriate timing without performing speed control against an intention of a user by receiving an instruction (intention) to switch between the driving modes from the occupant when a driving mode in which a task imposed on the occupant is light can be executed, performing speed adjustment of the host vehicle M, and performing mode switching when the target speed (for example, a speed limit) that can be executed is reached. According to the above-described embodiments, it is possible to cause the host vehicle M to travel in mode A even when a TJP condition is not satisfied, for example, when the host vehicle M is traveling alone or traveling in a follow-up form on an expressway in mode B or lower.

The embodiment described above can be represented as follows.

A vehicle control device including
a storage device that stores a program, and
a hardware processor,
wherein the vehicle control device is configured to
recognize a surroundings situation of a vehicle;
control one or both of steering and acceleration or deceleration of the vehicle based on the recognized surroundings situation;
receive an operation of switching between driving modes of the vehicle by an occupant of the vehicle;
cause the vehicle to travel in any of a plurality of driving modes including a first driving mode and a second driving mode in which a task imposed on an occupant of the vehicle is lighter than that in the first driving mode; and
switch the driving mode from the first driving mode to the second driving mode after a speed of the vehicle reaches a target speed when a traveling environment is such that the first driving mode is being executed and the second driving mode is able to be executed and when an operation of switching to the second driving mode is received, by the hardware processor executing the program stored in the storage device.

Although the embodiments for carrying out the present invention have been described above using the embodiments, the present invention is not limited to these embodiments and various modifications and substitutions can be made without departing from the gist of the present invention.

What is claimed is:

1. A vehicle control device comprising:
   a recognizer configured to recognize a surroundings situation of a vehicle;
   a driving controller configured to control one or both of steering and acceleration or deceleration of the vehicle based on the surroundings situation recognized by the recognizer; and
   a first receiver configured to receive an operation of switching between driving modes of the vehicle by an occupant of the vehicle,
   wherein the driving controller causes the vehicle to travel in any of a plurality of driving modes including a first driving mode and a second driving mode in which a task imposed on the occupant of the vehicle is lighter than that in the first driving mode, and
   the driving controller switches the driving mode from the first driving mode to the second driving mode after a speed of the vehicle reaches a target speed when a traveling environment is such that the first driving mode is being executed and the second driving mode is able to be executed and when an operation of switching to the second driving mode is received by the first receiver;
   wherein a lane in which the vehicle travels includes an overtaking lane for overtaking a preceding vehicle, and
   the driving controller performs lane changing of the vehicle from the overtaking lane to a lane other than the overtaking lane when the traveling environment is such that the vehicle is executing the first driving mode and the second driving mode is able to be executed and when an operation of switching to the second driving mode is received by the first receiver, and switches the driving mode from the first driving mode to the second driving mode after the speed of the vehicle reaches the target speed or after the speed of the vehicle reaches the target speed and then lane changing from the overtaking lane to the lane other than the overtaking lane is performed.

2. The vehicle control device according to claim 1, wherein the traveling environment in which the second driving mode is able to be executed includes that the vehicle has traveled in a traveling lane for a predetermined distance or more or a predetermined time or more.

3. The vehicle control device according to claim 1, further comprising an output controller configured to cause an output to output information on a status of the driving mode to the occupant of the vehicle, wherein the output controller causes the output to output information indicating that the second driving mode is able to be executed when the traveling environment is such that the first driving mode is being executed and the second driving mode is able to be executed.

4. The vehicle control device according to claim 3, wherein the output controller causes the output to output information for requesting the occupant to control the speed of the vehicle when adjustment of the speed of the vehicle to the target speed is required.

5. The vehicle control device according to claim 1, wherein acceleration or deceleration to the target speed is performed according to speed control by an operation of the occupant or speed control by the driving controller.

6. The vehicle control device according to claim 1, further comprising a second receiver configured to receive a setting of a speed when the vehicle travels in the first driving mode,
wherein the driving controller adjusts the speed of the vehicle based on the set speed received by the second receiver.

7. The vehicle control device according to claim 6, wherein the driving controller switches the driving mode from the first driving mode to the second driving mode when the speed of the vehicle reaches the target speed through the adjustment of the set speed.

8. The vehicle control device according to claim 1, wherein the target speed is a speed within a legal speed for a traveling lane of the vehicle.

9. The vehicle control device according to claim 8, wherein the driving controller curbs the execution of the second driving mode when a lower limit speed is set for the traveling lane and the speed of the vehicle is smaller than the lower limit speed for the traveling lane.

10. The vehicle control device according to claim 9, wherein the driving controller continues the second driving mode when the speed of the vehicle becomes smaller than the lower limit speed after the second driving mode is executed.

11. A vehicle control method comprising:
recognizing, by a computer, a surroundings situation of a vehicle;
controlling, by the computer, one or both of steering and acceleration or deceleration of the vehicle based on the recognized surroundings situation;
receiving, by the computer, an operation of switching between driving modes of the vehicle by an occupant of the vehicle;
causing, by the computer, the vehicle to travel in any of a plurality of driving modes including a first driving mode and a second driving mode in which a task imposed on an occupant of the vehicle is lighter than that in the first driving mode;
switching, by the computer, the driving mode from the first driving mode to the second driving mode after a speed of the vehicle reaches a target speed when a traveling environment is such that the first driving mode is being executed and the second driving mode is able to be executed and when an operation of switching to the second driving mode is received;
a lane in which the vehicle travels includes an overtaking lane for overtaking a preceding vehicle; and
performing, by the computer, lane changing of the vehicle from the overtaking lane to a lane other than the overtaking lane when the traveling environment is such that the vehicle is executing the first driving mode and the second driving mode is able to be executed and when an operation of switching to the second driving mode is received; and switching the driving mode from the first driving mode to the second driving mode after the speed of the vehicle reaches the target speed or after the speed of the vehicle reaches the target speed and then lane changing from the overtaking lane to the lane other than the overtaking lane is performed.

12. A computer-readable non-transitory storage medium having a program stored therein, the program causing a computer to:
recognize a surroundings situation of a vehicle;
control one or both of steering and acceleration or deceleration of the vehicle based on the recognized surroundings situation;
receive an operation of switching between driving modes of the vehicle by an occupant of the vehicle;
cause the vehicle to travel in any of a plurality of driving modes including a first driving mode and a second driving mode in which a task imposed on an occupant of the vehicle is lighter than that in the first driving mode; switch the driving mode from the first driving mode to the second driving mode after a speed of the vehicle reaches a target speed when a traveling environment is such that the first driving mode is being executed and the second driving mode is able to be executed and when an operation of switching to the second driving mode is received;
a lane in which the vehicle travels includes an overtaking lane for overtaking a preceding vehicle; and
perform lane changing of the vehicle from the overtaking lane to a lane other than the overtaking lane when the traveling environment is such that the vehicle is executing the first driving mode and the second driving mode is able to be executed and when an operation of switching to the second driving mode is received; and switch the driving mode from the first driving mode to the second driving mode after the speed of the vehicle reaches the target speed or after the speed of the vehicle reaches the target speed and then lane changing from the overtaking lane to the lane other than the overtaking lane is performed.

13. A vehicle control device comprising:
a recognizer configured to recognize a surroundings situation of a vehicle;
a driving controller configured to control one or both of steering and acceleration or deceleration of the vehicle based on the surroundings situation recognized by the recognizer; and
a first receiver configured to receive an operation of switching between driving modes of the vehicle by an occupant of the vehicle,
wherein the driving controller causes the vehicle to travel in any of a plurality of driving modes including a first driving mode and a second driving mode in which a task imposed on the occupant of the vehicle is lighter than that in the first driving mode, and
the driving controller switches the driving mode from the first driving mode to the second driving mode after a speed of the vehicle reaches a target speed when a traveling environment is such that the first driving mode is being executed and the second driving mode is able to be executed and when an operation of switching to the second driving mode is received by the first receiver,
further comprising an output controller configured to cause an output to output information on a status of the driving mode to the occupant of the vehicle, wherein the output controller causes the output to output information indicating that the second driving mode is able to be executed when the traveling environment is such that the first driving mode is being executed and the second driving mode is able to be executed, wherein the output controller causes the output to output information for requesting the occupant to control the speed of the vehicle when adjustment of the speed of the vehicle to the target speed is required.

14. A vehicle control device comprising:

a recognizer configured to recognize a surroundings situation of a vehicle;

a driving controller configured to control one or both of steering and acceleration or deceleration of the vehicle based on the surroundings situation recognized by the recognizer; and a first receiver configured to receive an operation of switching between driving modes of the vehicle by an occupant of the vehicle, wherein the driving controller causes the vehicle to travel in any of a plurality of driving modes including a first driving mode and a second driving mode in which a task imposed on the occupant of the vehicle is lighter than that in the first driving mode, and the driving controller switches the driving mode from the first driving mode to the second driving mode after a speed of the vehicle reaches a target speed when a traveling environment is such that the first driving mode is being executed and the second driving mode is able to be executed and when an operation of switching to the second driving mode is received by the first receiver, further comprising a second receiver configured to receive a setting of a speed when the vehicle travels in the first driving mode, wherein the driving controller adjusts the speed of the vehicle based on the set speed received by the second receiver, wherein the driving controller switches the driving mode from the first driving mode to the second driving mode when the speed of the vehicle reaches the target speed through the adjustment of the set speed.

15. A vehicle control device comprising:

a recognizer configured to recognize a surroundings situation of a vehicle;

a driving controller configured to control one or both of steering and acceleration or deceleration of the vehicle based on the surroundings situation recognized by the recognizer; and a first receiver configured to receive an operation of switching between driving modes of the vehicle by an occupant of the vehicle, wherein the driving controller causes the vehicle to travel in any of a plurality of driving modes including a first driving mode and a second driving mode in which a task imposed on the occupant of the vehicle is lighter than that in the first driving mode, and the driving controller switches the driving mode from the first driving mode to the second driving mode after a speed of the vehicle reaches a target speed when a traveling environment is such that the first driving mode is being executed and the second driving mode is able to be executed and when an operation of switching to the second driving mode is received by the first receiver, wherein the target speed is a speed within a legal speed for a traveling lane of the vehicle, wherein the driving controller curbs the execution of the second driving mode when a lower limit speed is set for the traveling lane and the speed of the vehicle is smaller than the lower limit speed for the traveling lane.

* * * * *